(12) United States Patent
Endo et al.

(10) Patent No.: US 9,543,055 B2
(45) Date of Patent: Jan. 10, 2017

(54) POSITIVE ACTIVE MATERIAL FOR NONAQUEOUS ELECTROLYTE SECONDARY BATTERY, METHOD OF MANUFACTURING THE POSITIVE ACTIVE MATERIAL, ELECTRODE FOR NONAQUEOUS ELECTROLYTE SECONDARY BATTERY, NONAQUEOUS ELECTROLYTE SECONDARY BATTERY AND METHOD OF MANUFACTURING THE SECONDARY BATTERY

(75) Inventors: Daisuke Endo, Kyoto (JP); Yoshihiro Katayama, Kyoto (JP); Tetsuya Murai, Kyoto (JP); Masafumi Shibata, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 13 days.

(21) Appl. No.: 13/997,783

(22) PCT Filed: Dec. 27, 2011

(86) PCT No.: PCT/JP2011/080220
§ 371 (c)(1),
(2), (4) Date: Jun. 25, 2013

(87) PCT Pub. No.: WO2012/091015
PCT Pub. Date: Jul. 5, 2012

(65) Prior Publication Data
US 2013/0313471 A1 Nov. 28, 2013

(30) Foreign Application Priority Data

Dec. 27, 2010 (JP) ................................ 2010-290965
Dec. 27, 2010 (JP) ................................ 2010-290966
(Continued)

(51) Int. Cl.
*H01B 1/08* (2006.01)
*C01G 45/12* (2006.01)
(Continued)

(52) U.S. Cl.
CPC ............. *H01B 1/08* (2013.01); *C01G 45/1221* (2013.01); *C01G 45/1228* (2013.01);
(Continued)

(58) Field of Classification Search
CPC ...... H01M 4/525; H01M 4/505; H01M 4/485; H01M 4/0471; H01M 4/0479; H01M 4/131; H01M 4/1391; H01B 1/08; C01G 53/44; C01G 53/50; C01G 51/44; C01G 51/50; C01G 45/1221; C01G 45/1228; C01D 15/02
See application file for complete search history.

(56) References Cited

U.S. PATENT DOCUMENTS 6,660,432 B2 * 12/2003 Paulsen .................. C01G 51/42
423/596
6,677,082 B2  1/2004 Thackeray et al.
(Continued)

FOREIGN PATENT DOCUMENTS

JP    10-106543    4/1998
JP    2002-124261  4/2002
(Continued)

OTHER PUBLICATIONS

Ohzuku, T. et al. Electrochemistry and Structural Chemistry of LiNiO2 R3m for 4V Secondary Lithium Cells. J. Electrochem. Soc. 1993. 140. 1862-1870.*
(Continued)

*Primary Examiner* — Mark Kopec
*Assistant Examiner* — Matthew R Diaz
(74) *Attorney, Agent, or Firm* — Rankin, Hill & Clark LLP

(57) ABSTRACT

An object of the present invention is to provide a positive active material for a nonaqueous electrolyte secondary battery which has a large discharge capacity and is superior in charge-discharge cycle performance, initial efficiency and high rate discharge performance, and a nonaqueous electrolyte secondary battery using the positive active material. The present invention pertains to a positive active material for a
(Continued)

nonaqueous electrolyte secondary battery containing a lithium transition metal composite oxide which has a crystal structure of an α-NaFeO$_2$ type, is represented by a compositional formula Li$_{1+\alpha}$Me$_{1-\alpha}$O$_2$ (Me is a transition metal element including Co, Ni and Mn, α>0), and has a molar ratio Li/Me of Li to the transition metal element Me of 1.2 to 1.6, wherein a molar ratio Co/Me of Co in the transition metal element Me is 0.02 to 0.23, a molar ratio Mn/Me of Mn in the transition metal element Me is 0.62 to 0.72, and the lithium transition metal composite oxide is observed as a single phase attributed to a space group R3-m on an X-ray diffraction chart when it is electrochemically oxidized up to a potential of 5.0 V (vs. Li/Li$^+$).

16 Claims, 8 Drawing Sheets

(30) Foreign Application Priority Data

| Dec. 27, 2010 | (JP) | 2010-290967 |
|---|---|---|
| Mar. 31, 2011 | (JP) | 2011-080917 |
| Mar. 31, 2011 | (JP) | 2011-080918 |
| Mar. 31, 2011 | (JP) | 2011-080919 |
| Jul. 7, 2011 | (JP) | 2011-150791 |
| Sep. 22, 2011 | (JP) | 2011-208184 |
| Oct. 26, 2011 | (JP) | 2011-234808 |

(51) Int. Cl.

| C01G 51/00 | (2006.01) |
|---|---|
| C01G 53/00 | (2006.01) |
| H01M 4/04 | (2006.01) |
| H01M 4/1391 | (2010.01) |
| H01M 4/131 | (2010.01) |
| H01M 4/505 | (2010.01) |
| H01M 4/525 | (2010.01) |
| H01M 10/052 | (2010.01) |

(52) U.S. Cl.
CPC ........... *C01G 51/44* (2013.01); *C01G 51/50* (2013.01); *C01G 53/44* (2013.01); *C01G 53/50* (2013.01); *H01M 4/0471* (2013.01); *H01M 4/131* (2013.01); *H01M 4/1391* (2013.01); *H01M 4/505* (2013.01); *H01M 4/525* (2013.01); *C01P 2002/72* (2013.01); *C01P 2004/61* (2013.01); *C01P 2006/11* (2013.01); *C01P 2006/12* (2013.01); *C01P 2006/40* (2013.01); *H01M 10/052* (2013.01); *Y02E 60/122* (2013.01); *Y02P 70/54* (2015.11); *Y02T 10/7011* (2013.01)

(56) References Cited

U.S. PATENT DOCUMENTS

| 6,855,461 | B2* | 2/2005 | Lampe-Onnerud | C01G 53/50 |
|---|---|---|---|---|
| | | | | 429/217 |
| 7,135,252 | B2 | 11/2006 | Thackeray et al. | |
| 7,314,684 | B2* | 1/2008 | Kang et al. | 429/231.95 |
| 7,939,202 | B2* | 5/2011 | Sakamoto | C01G 45/1228 |
| | | | | 423/594.4 |
| 2006/0188780 | A1 | 8/2006 | Fujii et al. | |
| 2009/0011335 | A1* | 1/2009 | Takeda et al. | 429/223 |
| 2009/0239146 | A1* | 9/2009 | Nakagawa | H01M 4/131 |
| | | | | 429/207 |
| 2009/0297947 | A1* | 12/2009 | Deng et al. | 429/218.1 |
| 2010/0209771 | A1* | 8/2010 | Shizuka | B82Y 30/00 |
| | | | | 429/207 |
| 2010/0233542 | A1 | 9/2010 | Endo et al. | |
| 2011/0037440 | A1 | 2/2011 | Endo et al. | |

FOREIGN PATENT DOCUMENTS

| JP | 2004-220952 | 8/2004 |
|---|---|---|
| JP | 2005-97087 | 4/2005 |
| JP | 2005-100947 | 4/2005 |
| JP | 2006-093067 | 4/2006 |
| JP | 2006-114256 | 4/2006 |
| JP | 2007-220630 | 8/2007 |
| JP | 2008-226693 | 9/2008 |
| JP | 2008-300180 | 12/2008 |
| JP | 2009-4285 | 1/2009 |
| JP | 2009-505367 | 2/2009 |
| JP | 2009-205893 | 9/2009 |
| JP | 2010-047466 | 3/2010 |
| JP | 2010-086690 | 4/2010 |
| WO | 2007/021148 | 2/2007 |

OTHER PUBLICATIONS

Reddy, M. et al. Preparation and Characterization of LiNi0.5Co0.5O2 and LiNi0.5Co0.4Al0.01O2 by Molten Salt Synthesis for Li Ion Batteries. J. Phys. Chem. 2007. 111. 11712-11720.*
Japanese Office Action dated Sep. 17, 2014 issued in the corresponding Japanese patent application No. 2011-080917.
International Search Report dated Apr. 24, 2012 filed in PCT/JP2011/080220.
S.-H. Kang and M. M. Thackeray. "Stabilization of xLi2MnO3$_\text{B}$ (1−x)LiMO2 Electrode Surfaces (M=Mn, Ni, Co) with Mildly Acidic, Fluorinated Solutions" Journal of The Electrochemical Society, 2008, 155(4), A269-A275.
S.-H. Kang and K. Amine "Layered Li(Li0.2Ni0.15+0.5zCo0.10Mn0.55-0.5z)O2—zFz cathode materials for Li-ion secondary batteries" Journal of Power Sources, 2005, 146, pp. 654-657.
Zhonghua Lu and J.R. Dahn. "Understanding the Anomalous Capacity of Li/Li[NixLi(1/3−2x/3)Mn(2/3−x13)] O 2 Cells Using in Situ X-Ray Diffraction and Electrochemical Studies" Journal of The Electrochemical Society, 2002, 149 (7), A815-A822.
Zhonghua Lu and L.Y. Beaulieu et al."Synthesis, Structure, and Electrochemical Behavior of Li[NixLi1/3−2x/3Mn2/3−x/3] O 2" Journal of the Electrochemical Society, 2002, 149(6), A778-A791.

* cited by examiner

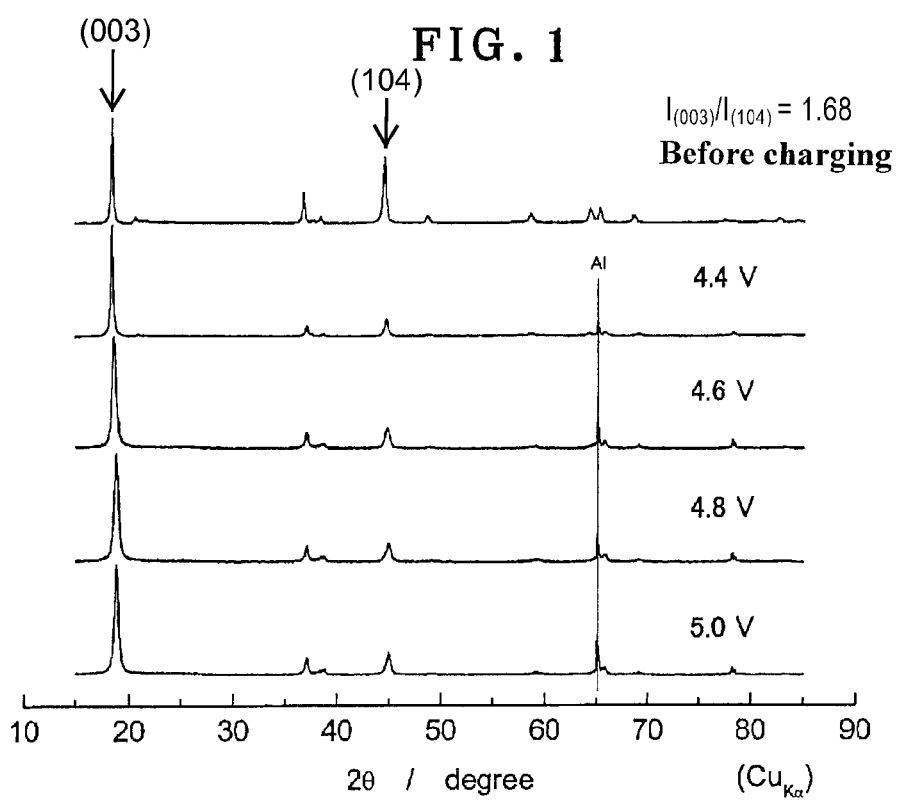

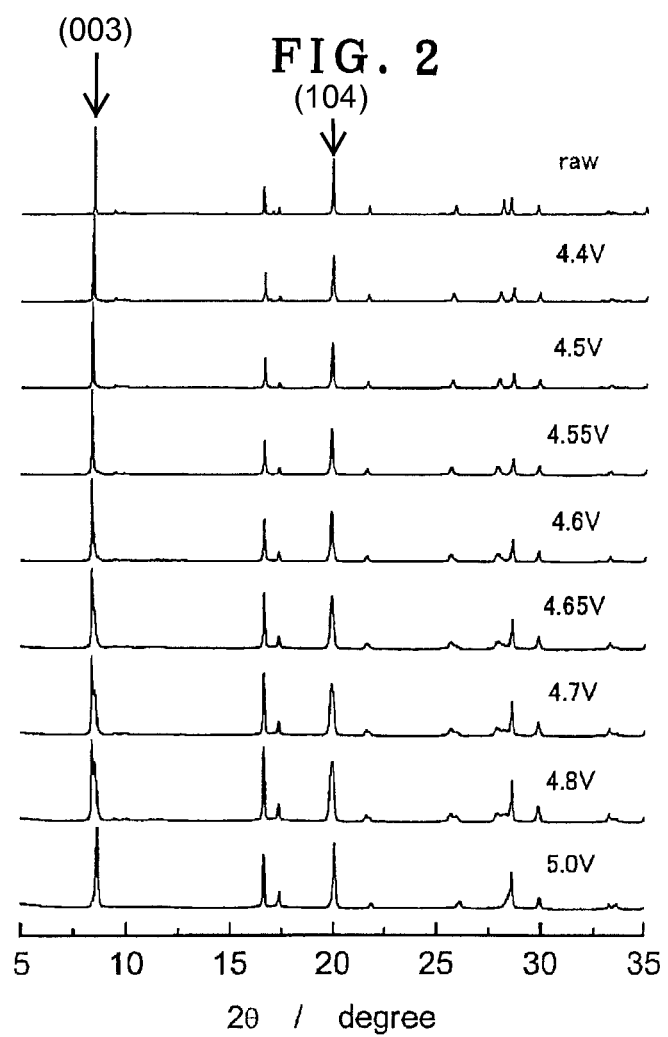

POSITIVE ACTIVE MATERIAL FOR NONAQUEOUS ELECTROLYTE SECONDARY BATTERY, METHOD OF MANUFACTURING THE POSITIVE ACTIVE MATERIAL, ELECTRODE FOR NONAQUEOUS ELECTROLYTE SECONDARY BATTERY, NONAQUEOUS ELECTROLYTE SECONDARY BATTERY AND METHOD OF MANUFACTURING THE SECONDARY BATTERY

TECHNICAL FIELD

The present invention relates to a positive active material for a nonaqueous electrolyte secondary battery and a nonaqueous electrolyte secondary battery using the same.

BACKGROUND ART

Conventionally, $LiCoO_2$ is mainly used as a positive active material for a nonaqueous electrolyte secondary battery. However, the discharge capacity of $LiCoO_2$ is about 120 to 130 mAh/g.

A solid solution of $LiCoO_2$ and another compound is known as a material of a positive active material for a nonaqueous electrolyte secondary battery. $Li[Co_{1-2x}Ni_xMn_x]O_2$ ($0<x\leq\frac{1}{2}$), which has a crystal structure of an $\alpha$-$NaFeO_2$ type and is a solid solution of three components, $LiCoO_2$, $LiNiO_2$ and $LiMnO_2$, has been presented in 2001. $LiNi_{1/2}Mn_{1/2}O_2$ or $LiCo_{1/3}Ni_{1/3}Mn_{1/3}O_2$ as an example of the solid solution has a discharge capacity of 150 to 180 mAh/g and is also superior in charge-discharge cycle performance.

For the above-mentioned so-called "$LiMeO_2$ type" active material, the so-called "lithium excess type" active material, in which a compositional ratio Li/Me of lithium (Li) to a transition metal (Me) is more than 1 and for example Li/Me is 1.25 to 1.6, is known. A compositional formula of such a material can be denoted by $Li_{1+\alpha}Me_{1-\alpha}O_2$ ($\alpha>0$). Here, when the compositional ratio Li/Me of lithium (Li) to a transition metal (Me) is denoted by $\beta$, $\beta=(1+\alpha)/(1-\alpha)$, and thus $\alpha=0.2$ if Li/Me is 1.5, for example.

In Patent Document 1, an active material, which is a kind of such an active material and can be represented as a solid solution of three components of $Li[Li_{1/3}Mn_{2/3}]O_2$, $LiNi_{1/2}Mn_{1/2}O_2$ and $LiCoO_2$, is described. Further, as a method of manufacturing a battery using the above-mentioned active material, it is described that by providing a production step in which charge at least reaching a region where a potential change is relatively flat, occurring within a positive electrode potential range of more than 4.3 V (vs. Li/Li$^+$) and 4.8 V (vs. Li/Li$^+$) or less, is performed, it is possible to manufacture a battery which can achieve a discharge capacity of 177 mAh/g or more even when employing a charge method in which a maximum achieved potential of a positive electrode at the time of charge is 4.3 V (vs. Li/Li$^+$) or less.

Such a so-called "lithium-excess type" positive active material has a problem that charge-discharge cycle performance and high rate discharge performance are not sufficient. Further, as described above, when in at least the first charge, charge is performed up to a relatively high potential more than 4.3 V, particularly up to a potential of 4.4 V or more, there is a feature of achieving a high discharge capacity, but initial charge-discharge efficiency (hereinafter, referred to as initial efficiency) in this case is not adequately high. Moreover, in Patent Document 1, the stability of the crystal structure, the oxygen position parameter, the specific surface area, and the tapped density are not described.

In Patent Document 2, it is described that a lithium-containing metal composite oxide of a layered rock salt type, an oxygen position parameter and a distance between lithium and oxygen relate to an initial discharge capacity and charge-discharge cycle performance. However, it is not described how the oxygen position parameter affects the high rate discharge performance.

In Patent Documents 3 and 4, an active material for a lithium secondary battery of the general formula $xLiMO_2\cdot(1-x)Li_2M'O_3$ ($0<x<1$) is described, and it is also described that M is at least one selected from Mn, Co and Ni, and Mn is selected for M', and it is shown that the active material containing enriched Li stabilizes a crystal structure, and by using the active material, a lithium secondary battery having a large discharge capacity is attained, but the stability of the crystal structure in being electrochemically oxidized to a high potential is not clear, and improvements in charge-discharge cycle performance, initial efficiency and high rate discharge performance are not described. Also, in these Patent Documents, an active material in which the content of Mn is large and the content of Co is small is not specifically described, and the oxygen position parameter, the specific surface area, and the tapped density are not also described.

In Patent Document 5, an active material for a lithium secondary battery of the general formula $Li_{1+x}Ni_\alpha Mn_\beta A_\gamma O_2$ (x is 0 to 0.2, $\alpha$ is 0.1 to 0.5, $\beta$ is 0.4 to 0.6, and $\gamma$ is 0 to 0.1) is described, and it is also described that Co is selected for A, and it is shown that by using the active material having the above composition and containing enriched Li, which is produced by a specific method, a lithium secondary battery having a large discharge capacity is attained, but improvements in charge-discharge cycle performance, initial efficiency and high rate discharge performance are not described. Further, in Patent Document 5, the invention of an active material in which a molar ratio of Li to a transition metal element is 0.2 or more and the content of Mn in the transition metal element is more than 0.6 is not described, and the stability of the crystal structure, the oxygen position parameter, the specific surface area, and the tapped density are not also described.

In Patent Document 6, described is "A lithium battery, wherein when at least one transition metal selected from Groups 7A and 8A of the periodic table is denoted by Me, a transition metal different from the Me is denoted by Mt, and at least one element selected from the group consisting of Mt, Na, K, Rb, Cs, Al, Ga, In, Tl, B, Mg, Ca, Sr, Ba and Pb is denoted by A, the battery includes a positive active material comprising a composite oxide having the composition represented by $Li_X Me_Y A_{(1-Y)} O_{(1+X)}$ ($1.3\leq X\leq 2.5$, $0.5\leq Y\leq 0.999$), and a hexagonal crystal structure" (claim 1), and it is shown that the positive active material containing enriched Li stabilizes a crystal structure, and by using the positive active material, a lithium secondary battery having a high energy density is attained, but the stability of the crystal structure in being electrochemically oxidized to a high potential is not clear, and improvements in charge-discharge cycle performance, initial efficiency and high rate discharge performance are not described. Further, in Patent Document 6, an active material in which x is 1.3, Me is Mn, A is Co, the content of Mn is large and the content of Co is small is described, but it is not specifically described that Co and Ni are selected as A, and the oxygen position parameter, the specific surface area, and the tapped density are not also described.

In Patent Document 7, described is the invention of "A positive electrode material for a nonaqueous electrolyte secondary battery using a lithium manganese nickel cobalt oxide comprising lithium, manganese, nickel, cobalt and oxygen, wherein the lithium manganese nickel cobalt oxide has a layered structure and is represented by Li[Li$_{[(1-2x-y)/3]}$Ni$_x$Co$_y$Mn$_{[(2-x-2y)/3]}$]O$_2$, and x and y satisfy 0.2<x<0.5, 0<y<0.2, and 1<2x+y" (claim 1), and it is shown that by using the positive electrode material, cycle characteristics are improved, but improvements in initial efficiency and high rate discharge performance are not described. Further, as an example, Li$_{1.15}$Ni$_{0.25}$Co$_{0.05}$Mn$_{0.55}$O$_2$, a lithium manganese nickel cobalt oxide in which a molar ratio Li/Me of Li to all transition metal elements Me is 1.353, a molar ratio Co/Me is 0.059, and a molar ratio Mn/Me is 0.647, is described (Example 4), but the stability of the crystal structure of the positive electrode material, the oxygen position parameter, the specific surface area, and the tapped density are not described.

In Patent Document 8, described is "A positive active material containing a lithium composite oxide represented by the following chemical formula: [Chem. 1] Li$_{1+a}$[Mn$_b$Co$_c$Ni$_{(1-b-c)}$]$_{(1-a)}$O$_{(2-d)}$, wherein a, b, c and d satisfy 0<a<0.25, 0.5≤b<0.7, 0≤c<(1-b), and -0.1≤d≤0.2" (claim 1), and it is shown that by using the positive active material, a large discharge capacity and good cycle characteristics can be realized, and charge-discharge efficiency is also shown, but the invention is not intended to improve the charge-discharge efficiency, and an improvement in high rate discharge performance is not described. Further, as an example, lithium composite oxides in which a molar ratio Li/Me of Li to all transition metal elements Me is 1.30 are described (Example 1-3, Examples 2-2 to 2-8, Examples 3-1 and 3-2), but these composite oxides are synthesized by using "a solid state method", and most of the composite oxides contain less Mn. As only one active material containing Mn in a large amount, Li$_{1.13}$[Mn$_{0.65}$Co$_{0.20}$Ni$_{0.15}$]$_{0.87}$O$_2$ is shown, but the stability of the crystal structure of the positive active material, the oxygen position parameter, the specific surface area, and the tapped density are not described.

On the other hand, with respect to lithium transition metal composite oxides composed of Li and transition metal elements (Co, Ni, Mn, etc.), active materials in which the specific surface area and the tapped density are increased are known (refer to e.g., Patent Documents 9 and 10).

In Patent Document 9, described is the invention of "A positive active material having a laminar crystal structure, wherein a sequence of a lithium element and an oxygen element composing an oxide composed of crystal particles of the oxide containing at least three transition metal elements is a cubic structure, and a specific surface area is 0.9 to 2.5 m$^2$/g, and a tapped density is 1.8 to 2.5 g/cm$^3$" (claim 1), and it is shown that in accordance with this invention, a lithium secondary battery having high initial charge-discharge efficiency (initial efficiency) and excellent durability of a charge-discharge cycle can be obtained. Further, in Patent Document 9, described is "A positive active material for a lithium secondary battery represented by the general formula Li[Li$_q$Co$_x$Ni$_y$Mn$_z$]O$_2$, in which q satisfies -0.2≤q≤0.2, 0.8≤1+q≤1.2, X satisfies 0.1<X≤0.6, Y satisfies 0.1<Y≤0.6, Z satisfies 0.2<Z≤0.6, and X, Y and Z satisfy 0.7≤X+Y+Z≤1.2" (claim 2), but since a positive active material, in which a molar ratio of Li to the transition metal element is 1.2 or more and a molar ratio of Mn in the transition metal element is 0.625 or more, is not specifically described, the initial efficiency and the charge-discharge cycle performance of the positive active material having such composition cannot be predicted. Further, the stability of the crystal structure composing the positive active material and the oxygen position parameter are not described.

In Patent Document 10, described is the invention of "A lithium nickel manganese cobalt composite oxide for a lithium secondary battery positive active material represented by the following general formula (1):

$$\text{Li}_x\text{Ni}_{1-y-z}\text{Mn}_y\text{Co}_z\text{O}_2 \qquad (1)$$

in which x satisfies 0.9≤x≤1.3, y satisfies 0<y<1.0, z satisfies 0<z<1.0, and y and z satisfy y+z<1, wherein an average particle size is 5 to 40 μm, a BET specific surface area is 5 to 25 m$^2$/g, and a tapped density is 1.70 g/ml or more" (claim 1), and it is shown that in accordance with this invention, a lithium secondary battery having high initial efficiency and excellent loading characteristics (high rate discharge performance) can be obtained. However, since a positive active material in which x is 1.2 or more and y is 0.625 or more is not specifically described in Patent Document 10, the initial efficiency and the high rate discharge performance of the positive active material having such composition cannot be predicted. Further, the stability of the crystal structure composing the positive active material and the oxygen position parameter are not described.

In improvement in high rate discharge performance of the lithium transition metal composite oxide in which lithium is enriched, partial fluorination of a part of oxygen (Non-patent Document 1) and a surface coating technology (Non-patent Document 2) are proposed. However, all of these are technologies expecting use at 4.5 V or more as a positive electrode charge potential corresponding to a potential region of decomposition of an electrolyte solution, and are not technologies intended to improve high rate discharge performance at the time when the positive electrode charge potential is changed to a potential lower than 4.5 V, for example, 4.3 V, after initial formation to use a battery.

Moreover, the so-called "lithium-excess type" positive active material has a problem that oxygen gas is generated during charge (refer to e.g., Patent Documents 11, 12, and Non-patent Documents 3, 4).

In Patent Document 11, described is the invention of "A method of manufacturing an electrochemical element comprising the step of charging an electrode active material having a plateau potential, at which gas is generated in a charge range, to the plateau potential or more; and the step of removing the gas" (claim 1), "The manufacturing method according to any one of claims 1 to 3, wherein the positive active material has a plateau potential of 4.4 to 4.8 V" (claim 4), "The manufacturing method according to claim 1, wherein the gas is oxygen (O$_2$) gas" (claim 5), "An electrochemical element, wherein an electrode active material having a plateau potential at which gas is generated in a charge range is charged to the plateau potential or more, and then the gas is removed" (claim 6), "The electrochemical element according to claim 6, wherein the electrode active material has a plateau potential of 4.4 to 4.8 V" (claim 7), and "The electrochemical element according to claim 8, wherein after charging to the plateau potential or more and removing gas, a discharge capacity of the electrode active material ranges from 100 mAh/g to 280 mAh/g in a voltage range of 3.0 to 4.4 V" (claim 10).

Further, when as the above electrode active material, a chemical formula 1 "a solid solution of XLi(Li$_{1/3}$M$_{2/3}$)O$_2$+YLiM'O$_2$ in which M is one or more elements selected from metals having an oxidation number of 4+, M' is one or more elements selected from transition metals, and X and Y satisfy 0<X<1, 0<Y<1, and X+Y=1" (claim 2, claim 8, and paragraph [0024]) is used, "When being charged to an oxidation-reduction potential of M' or more, Li is extracted and simultaneously oxygen is also detached in order to have a balance between oxidation and reduction. Accordingly, the electrode active material has a plateau potential" (paragraph [0025]), "The compound of the chemical formula 1 is preferred since the electrode active material functions stably as an electrode active material in a charge-discharge cycle after the electrode active material is charged to a charge voltage (4.4 to 4.8 V) of a plateau potential or more and the gas removal step is performed" (paragraph [0026]), and "Preferably, M is one or more elements selected from Mn, Sn and Ti metals, and M' is one or more elements selected from Ni, Mn, Co and Cr metals" (paragraph [0027]) are described.

Moreover, in Patent Document 11, "When a battery is configured by a method in which the active material is charged to a plateau potential or more once or more and then the gas removal step is performed according to the present invention, even though the active material is charged to a plateau potential or more continuously, a battery having a high capacity is configured, and a problem of a battery due to gas generation can also be solved. That is, After charging to a plateau potential or more, gas is not generated in charge in the subsequent cycles, and a plateau range disappears (refer to FIG. 4) (paragraph [0022]) is described, and as Example 4, it is shown that in the case where $Li(Li_{0.2}Ni_{0.2}Mn_{0.6})O_2(\tfrac{3}{5}[Li(Li_{1/3}Mn_{2/3})O_2]+\tfrac{2}{5}[Li Ni_{1/2}Mn_{1/2}]O_2)$ is used as a positive active material (paragraph [0048]), and "charged to 4.8 V in a first cycle, and charged to 4.4 V in a second cycle" (paragraph [0060]), a battery having a high capacity can be obtained (refer to FIG. 5). However, it is suggested that as described in Comparative Examples 5 and 6, oxygen gas is not generated when charging up to 4.25 V or 4.4 V that is a plateau potential or less, but only a battery having a low discharge capacity can be obtained (paragraph [0056], FIG. 1, paragraph [0057], and FIG. 2), and therefore it cannot be said that a positive active material, which does not generate oxygen gas even when charging up to a voltage higher than a plateau potential, is shown.

In Non-patent Documents 3 and 4, it is shown that when $Li[Ni_xLi_{(1/3-2x/3)}Mn_{(2/3-x/3)}]O_2$ is used as a positive active material, oxygen gas is generated at a charge voltage (4.5 V to 4.7 V) that is a plateau potential or more (left column line 4 to right column line 2 in page A818 in Non-patent Document 3, left column line 9 in page A785 to right column line 4 in page A788 in Non-patent Document 4), but it is not shown that oxygen gas is not generated when charging up to a high voltage that is a plateau potential or more.

In Patent Document 12, described is the invention of "A nonaqueous-type (lithium ion) secondary battery formed by winding or layer stacking a positive electrode plate, in which a current collector is provided with an active material layer capable of intercalation/deintercalation lithium ions thereon, and a negative electrode plate with a separator sandwiched between the electrode plates to form an electrode group, and housing the electrode group in a case hermetically together with a nonaqueous electrolyte, wherein an active material to be charged at 4.3 V or less on the Li/Li$^+$ basis and a substance to generate oxygen gas at the time of overcharge exist on the positive electrode plate" (claim 1), and "The lithium ion secondary battery according to claim 1, wherein an active material represented by $Li[(Ni_{0.5}Mn_{0.5})_xCo_y(Li_{1/3}Mn_{1/3})_z]O_2$ (x+y+z=1, z>0) or $Li\alpha Ni\beta Mn\gamma O_2$ ($\alpha$ is 1.1 or more, $\beta:\gamma=1:1$) is used as the substance to generate oxygen gas at the time of overcharge" (claim 2), and it is described that the lithium-excess transition metal composite oxides (Examples 1 to 3 and 7: $Li_{1.2}Ni_{0.4}Mn_{0.4}O_2$, Examples 4 to 6: $Li[(Ni_{0.5}Mn_{0.5})_{1/12}Co_{1/4}(Li_{1/3}Mn_{2/3})_{1/3}]O_2$ (x=5/12, y=1/4, z=1/3)) easily generate oxygen gas at the time of overcharge in comparison with the lithium transition metal composite oxide (not lithium-excess) (Comparative Examples 1: $LiCoO_2$, Comparative Example 2: $LiNi_{0.5}Mn_{0.5}O_2$, Comparative Example 3: $Li(N_{1/3}Mn_{1/3}Co_{1/3})O_2$) (paragraph [0064]), and it is described that in the invention described in Patent Document 12, on the contrary, utilizing the above-mentioned property of the lithium-excess transition metal composite oxide, "By gas generation at the time of overcharge, since the positive active material layer is detached from the current collector, the positive electrode plate is detached from the separator, or positive electrode layer inside is split, it is possible to cut out charge and prevent decomposition of the electrolyte solution, decomposition of the positive active material and short-circuit due to deposit of Li to the negative electrode side" (paragraph [0010]).

Moreover, since it is described in Patent Document 12 that "In the lithium ion secondary battery of the present invention, as the positive active material generating oxygen gas at the time of overcharge, it is preferred to use a lithium-excess positive active material $Li[(Ni_{0.5}Mn_{0.5})_xCo_y(Li_{1/3}Mn_{1/3})_z]O_2$ (wherein x+y+z=1, z>0) or an active material represented by $Li\alpha Ni\beta Mn\gamma O_2$ ($\alpha$ is 1.1 or more, $\beta:\gamma=1:1$). When the above active material is used, oxygen gas is generated at about 4.5 V on the Li/Li$^+$ basis, and thereby, a distance between the positive electrode and the negative electrode can be increased", the positive active material not generating oxygen gas when charging up to 4.5 V or more is not shown.

On the other hand, since oxygen gas generated from the positive active material causes failures such as oxidation of a solvent constituting an electrolyte of a nonaqueous electrolyte secondary battery (lithium secondary battery) and heating of the battery, a positive electrode (positive active material) for a nonaqueous electrolyte secondary battery in which oxygen gas generation at the time of overcharge or high-temperature is suppressed is also developed (refer to e.g., Patent Documents 13 and 14).

With respect to the invention described in Patent Document 13, in claim 1, difficulty of generation of oxygen gas of a lithium-containing composite oxide (lithium transition metal composite oxide) is specified as "a local maximum value of oxygen generation peak in gas chromatography-mass spectrometry measurement of the composite oxide" and "a range of 330 to 370° C.", and it is described that "In GC/MS measurement, a temperature of a positive composite is raised at a rate of 10° C./min from room temperature to 500° C., and behavior of oxygen generation was observed. Here, the obtained oxygen generation spectrum (A) is shown in FIG. 3. As is apparent from FIG. 3, in the spectrum (A), a local maximal value of an oxygen generation peak is positioned at a side of temperature higher than 350° C. From this, it is evident that the positive active material of the present invention is hardly decomposed while generating oxygen, and is extremely superior in stability even when being exposed to high-temperature in overcharge region of a battery voltage of 4.7 V" (paragraph [0041]).

However, in Patent Document 13, only the positive active material "represented by the general formula: $Li_zCo_{1-x-y}Mg_xM_yO_2$, wherein an element M in the general formula is at least one selected from the group consisting of Al, Ti, Sr, Mn, Ni and Ca, and x, y and z in the general formula satisfy $0 \leq z \leq 1.03$, $0.005 \leq x \leq 0.1$, and $0.001 \leq y \leq 0.03$" is specifically described (claims 2 and 3), and the "lithium-excess type" positive active material not generating oxygen gas in an overcharge region is not shown.

In Patent Document 14, it is shown that release of oxygen from a positive electrode at the time of high-temperature is suppressed by mixing an oxygen-storing material with a positive active material or attaching the oxygen-storing material to the positive active material (claim 1, paragraphs [0005], [0056]), and it is described that "Peak temperatures of oxygen detachment of the positive electrodes (samples 1 to 4) having a Ce oxide or a Ce—Zr oxide as an oxygen-storing material are all 300° C. or higher, and the peak temperatures were significantly increased relative to that in the sample 5 not having an oxygen-storing material. This shows that in the samples 1 to 4, a phenomenon of releasing oxygen from the positive electrode is suppressed better (to higher temperature) than the phenomenon in the sample 5" (paragraph [0057]), but the positive active material (lithium transition metal composite oxide) not generating oxygen gas at a high-temperature is not shown.

PRIOR ART DOCUMENTS

Patent Documents

Patent Document 1: JP-A-2010-086690
Patent Document 2: JP-A-2002-124261
Patent Document 3: U.S. Pat. No. 6,677,082 Specification
Patent Document 4: U.S. Pat. No. 7,135,252 Specification
Patent Document 5: U.S. Pat. No. 7,314,684 Specification
Patent Document 6: JP-A-10-106543
Patent Document 7: JP-A-2005-100947
Patent Document 8: JP-A-2007-220630
Patent Document 9: JP-A-2006-93067
Patent Document 10: JP-A-2009-205893
Patent Document 11: JP-A-2009-505367
Patent Document 12: JP-A-2008-226693
Patent Document 13: JP-A-2004-220952
Patent Document 14: JP-A-2006-114256

Non-Patent Documents

Non-patent Document 1: Thackeray et al., 155(4), 269-275 (2008)
Non-patent Document 2: Kang et al., JPS, 146, 654-657 (2005)
Non-patent Document 3: Journal of The Electrochemical Society, 149 (7) A815-A822 (2002)
Non-patent Document 4: Journal of The Electrochemical Society, 149 (6) A778-A791 (2002)

DISCLOSURE OF THE INVENTION

Problems to be Solved by the Invention

It is a first object of the present invention to provide a positive active material for a nonaqueous electrolyte secondary battery having a large discharge capacity and excellent charge-discharge cycle performance, and a nonaqueous electrolyte secondary battery using the positive active material.

It is a second object of the present invention to provide a positive active material for a nonaqueous electrolyte secondary battery having a large discharge capacity and excellent initial efficiency, and a nonaqueous electrolyte secondary battery using the positive active material.

It is a third object of the present invention to provide a positive active material for a nonaqueous electrolyte secondary battery having a large discharge capacity and excellent high rate discharge performance, and a nonaqueous electrolyte secondary battery using the positive active material.

It is a fourth object of the present invention to provide a positive active material which does not generate oxygen gas from a lithium transition metal composite oxide even when a battery is charged up to a high voltage, and has a large discharge capacity and has a large discharge capacity particularly even when a charge method, in which a maximum achieved potential of a positive electrode at the time of charge is lower than 4.4 (vs. Li/Li$^+$), is employed, and to provide a nonaqueous electrolyte secondary battery using the positive active material and a method of manufacturing the nonaqueous electrolyte secondary battery.

Means for Solving the Problems

A constitution and an operation effect of the present invention will be described including technical thought. However, an operation mechanism includes presumption, and its right and wrong does not limit the present invention. In addition, the present invention may be carried out in other various forms without departing from the spirit and main features. Therefore, embodiments and examples described later are merely exemplifications in all respects and are not to be construed to limit the scope of the present invention. Moreover, variations and modifications belonging to an equivalent scope of the claims are all within the scope of the present invention.

In the present invention, the following means are employed in order to solve the above-mentioned problems.

(1) A positive active material for a nonaqueous electrolyte secondary battery containing a lithium transition metal composite oxide which has a crystal structure of an α-NaFeO$_2$ type, is represented by a compositional formula Li$_{1+\alpha}$Me$_{1-\alpha}$O$_2$ (Me is a transition metal element including Co, Ni and Mn, α>0), and has a molar ratio Li/Me of Li to the transition metal element Me of 1.2 to 1.6, wherein a molar ratio Co/Me of Co in the transition metal element Me is 0.02 to 0.23, a molar ratio Mn/Me of Mn in the transition metal element Me is 0.62 to 0.72, and the lithium transition metal composite oxide is observed as a single phase attributed to a space group R3-m on an X-ray diffraction chart when it is electrochemically oxidized up to a potential of 5.0 V (vs. Li/Li$^+$).

(2) The positive active material for a nonaqueous electrolyte secondary battery according to the above (1), wherein in the lithium transition metal composite oxide, a molar ratio Li/Me of Li to the transition metal element Me is 1.25 to 1.40.

(3) The positive active material for a nonaqueous electrolyte secondary battery according to the above (1), wherein in the lithium transition metal composite oxide, an oxygen position parameter, determined by crystal structure analysis by a Rietveld method at the time of using a space group R3-m as a crystal structure model based on an X-ray diffraction pattern in a state of a discharge end, is 0.260 or less.

(4) The positive active material for a nonaqueous electrolyte secondary battery according to the above (2), wherein a BET specific surface area is 0.88 m$^2$/g or more.

(5) The positive active material for a nonaqueous electrolyte secondary battery according to the above (4), wherein a tapped density is 1.25 g/cm$^3$ or more.

(6) The positive active material for a nonaqueous electrolyte secondary battery according to the above (2), wherein a molar ratio Li/Me of Li to all transition metal elements Me is 1.250 to 1.350, a molar ratio Co/Me is 0.040 to 0.195, and a molar ratio Mn/Me is 0.625 to 0.707.

(7) The positive active material for a nonaqueous electrolyte secondary battery according to the above (1), wherein a ratio between the diffraction peak intensity $I_{(003)}$ of (003) line and the diffraction peak intensity $I_{(114)}$ of (114) line based on X-ray diffraction measurement before charge-discharge satisfies $I_{(003)}/I_{(114)} \geq 1.20$.

(8) The positive active material for a nonaqueous electrolyte secondary battery according to the above (1), wherein a molar ratio Li/Me of Li to the transition metal element Me is 1.25 to 1.40, and oxygen gas is not generated from the lithium transition metal composite oxide when charge is performed up to any potential within the range of 4.5 to 4.6 V (vs. Li/Li$^+$) as a maximum achieved potential of a positive electrode.

(9) The positive active material for a nonaqueous electrolyte secondary battery according to the above (1), wherein a molar ratio Li/Me of Li to the transition metal element Me is 1.25 to 1.40, and a volume ratio of oxygen to the total amount of nitrogen and oxygen, respectively contained in gas in a battery, is 0.20 to 0.25 when charge is performed up to any potential within the range of 4.5 to 4.6 V (vs. Li/Li$^+$) as a maximum achieved potential of a positive electrode.

(10) The positive active material for a nonaqueous electrolyte secondary battery according to the above (8), wherein oxygen gas is not generated from the lithium transition metal composite oxide when charge is performed up to any potential within the range of 4.55 to 4.6 V (vs. Li/Li$^+$) as a maximum achieved potential of a positive electrode.

(11) The positive active material for a nonaqueous electrolyte secondary battery according to the above (8), wherein the charge is a charge in the initial charge-discharge.

(12) The positive active material for a nonaqueous electrolyte secondary battery according to the above (8), wherein the positive active material has a plateau potential in a charge range, and any potential within the range of 4.5 to 4.6 V (vs. Li/Li$^+$) is the plateau potential or more.

(13) The positive active material for a nonaqueous electrolyte secondary battery according to the above (1), wherein the lithium transition metal composite oxide is obtained by mixing/sintering a coprecipitated precursor of compounds of the transition metal elements including Co, Ni and Mn, and a lithium compound.

(14) A method of manufacturing the positive active material for a nonaqueous electrolyte secondary battery according to any one of the above (1) to (13), comprising the steps of coprecipitating compounds of transition metal elements including Co, Ni and Mn in a solution to produce a coprecipitated precursor; and mixing/sintering the coprecipitated precursor and a lithium compound.

(15) The method of manufacturing a positive active material for a nonaqueous electrolyte secondary battery according to the above (14), wherein a pH in the step of coprecipitating compounds of transition metal elements including Co, Ni and Mn in a solution to produce a coprecipitated precursor is 8.5 to 11.0.

(16) The method of manufacturing a positive active material for a nonaqueous electrolyte secondary battery according to the above (14), wherein a sintering temperature in the step of mixing/sintering the coprecipitated precursor and a lithium compound is 800 to 940° C.

(17) An electrode for a nonaqueous electrolyte secondary battery containing the positive active material for a nonaqueous electrolyte secondary battery according to any one of the above (1) to (13).

(18) A nonaqueous electrolyte secondary battery including the electrode for a nonaqueous electrolyte secondary battery according to the above (17).

(19) The nonaqueous electrolyte secondary battery according to the above paragraph (18), wherein a charge method, in which a maximum achieved potential of a positive electrode at the time of charge is lower than 4.4 V (vs. Li/Li$^+$), is employed at the time of use.

(20) A method of manufacturing a nonaqueous electrolyte secondary battery, wherein in a method of manufacturing a lithium secondary battery in which a positive active material containing a lithium transition metal composite oxide is used and a step including initial charge-discharge is performed, as the above-mentioned lithium transition metal composite oxide, a lithium transition metal composite oxide, having a crystal structure of an α-NaFeO$_2$ type, represented by a compositional formula Li$_{1+\alpha}$Me$_{1-\alpha}$O$_2$ (Me is a transition metal element including Co, Ni and Mn, α>0) and having a molar ratio Li/Me of Li to the transition metal element Me of 1.25 to 1.40, is used, and wherein charge in the above-mentioned initial charge-discharge is performed up to any potential within the range of 4.5 V (vs. Li/Li$^+$) or more and less than 4.6 V (vs. Li/Li$^+$) as a maximum achieved potential of a positive electrode without generating oxygen gas from the lithium transition metal composite oxide.

(21) The method of manufacturing a nonaqueous electrolyte secondary battery according to the above (20), wherein the positive active material has a plateau potential in a charge range, and any potential within the range of 4.5 V (vs. Li/Li$^+$) or more and less than 4.6 V (vs. Li/Li$^+$) as a maximum achieved potential of a positive electrode is the plateau potential or more.

Advantages of the Invention (a) In accordance with the above-mentioned means (1) to (13) of the present invention, a positive active material for a nonaqueous electrolyte secondary battery having a large discharge capacity and excellent charge-discharge cycle performance can be provided.

(b) In accordance with the above-mentioned means (2) and (4) to (6) of the present invention, a positive active material for a nonaqueous electrolyte secondary battery having excellent initial efficiency in addition to the effect of the above (a) can be provided.

(c) In accordance with the above-mentioned means (3) of the present invention, a positive active material for a nonaqueous electrolyte secondary battery having excellent high rate discharge performance in addition to the effect of the above (a) can be provided.

(d) In accordance with the above-mentioned means (5) and (6) of the present invention, a positive active material for a nonaqueous electrolyte secondary battery having excellent initial efficiency and excellent high rate discharge performance in addition to the effect of the above (a) can be provided.

(e) In accordance with the above-mentioned means (8) to (12) of the present invention, a positive active material for a nonaqueous electrolyte secondary battery not generating oxygen gas even when a battery is charged at a high voltage in addition to the effect of the above (a) can be provided.

(f) In accordance with the above-mentioned means (14) to (16) of the present invention, a method of manufacturing a positive active material for a nonaqueous electrolyte secondary battery which exerts the effects of the above (a) to (e) can be provided.

(g) In accordance with the above-mentioned means (17) to (19) of the present invention, it is possible to provide an electrode containing a positive active material for a non-aqueous electrolyte secondary battery which exerts the effects of the above (a) to (e), and a battery including the electrode.

(h) In accordance with the above-mentioned means (20) and (21) of the present invention, it is possible to provide a method of manufacturing a nonaqueous electrolyte secondary battery which uses a positive active material not generating oxygen gas even when a battery is charged at a high voltage.

BRIEF DESCRIPTION OF THE DRAWINGS

FIG. 1 is an X-ray diffraction chart at each electrochemical oxidation stage of a positive active material according to Example 1-1.

FIG. 2 is an X-ray diffraction chart at each electrochemical oxidation stage of a positive active material according to Comparative Example 1-1.

MODE FOR CARRYING OUT THE INVENTION

Figure 3A:
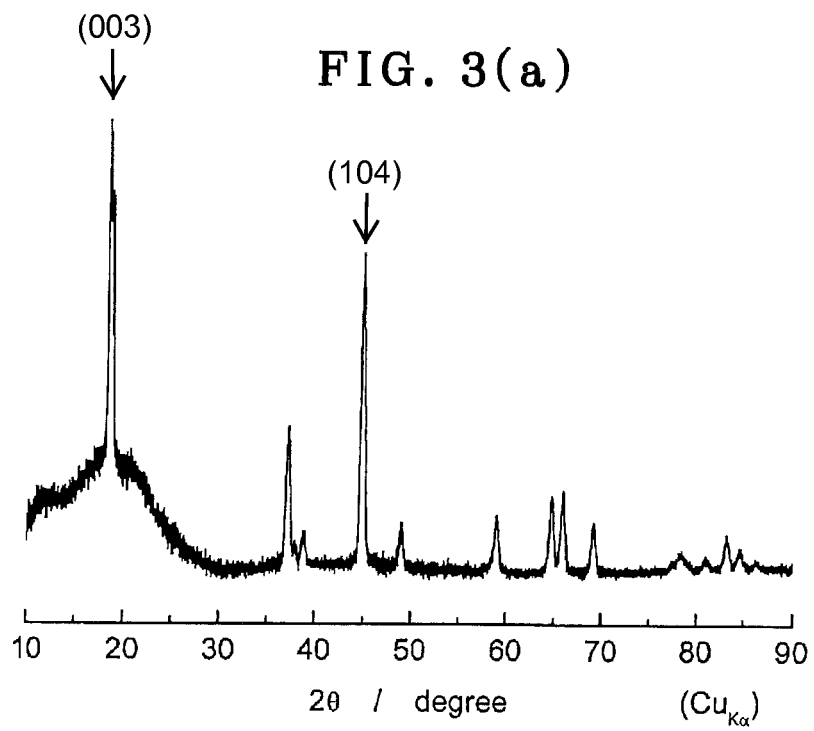
FIG. 3 is an X-ray diffraction chart at each electrochemical oxidation stage of a positive active material according to Comparative Example 1-2 and its partial enlarged view.
Figure 3B:
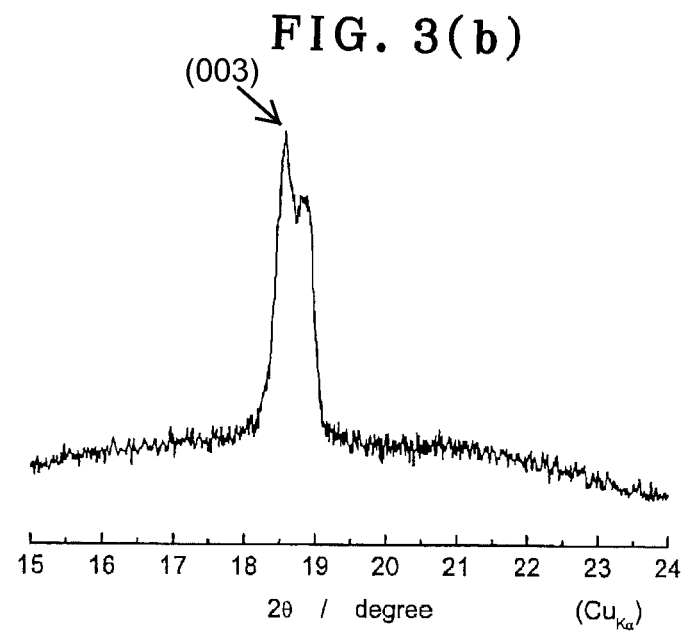

With respect to the composition of the lithium transition metal composite oxide contained in the active material for a nonaqueous electrolyte secondary battery of the present invention, the lithium transition metal composite oxide may contain the transition metal elements including Co, Ni and Mn, and Li, a molar ratio Li/Me of Li to the transition metal element Me may be 1.2 to 1.6, a molar ratio Co/Me of Co in the transition metal element Me may be 0.02 to 0.23, and a molar ratio Mn/Me of Mn in the transition metal element Me may be 0.62 to 0.72 in that a high discharge capacity is attained.

The lithium transition metal composite oxide is represented by the general formula $Li_aCo_xNi_yMn_zO_2$ (a+x+y+z=2), and it is preferred that a/(x+y+z) is 1.2 to 1.6, x/(x+y+z) is 0.02 to 0.23, and z/(x+y+z) is 0.62 to 0.72.

A lithium secondary battery having a large discharge capacity can be attained when the lithium transition metal composite oxide, which satisfies the requirements that a molar ratio Li/Me of Li to the transition metal element Me is 1.2 to 1.6 (a/(x+y+z) is 1.2 to 1.6), a molar ratio Co/Me of Co to the Me is 0.02 to 0.23 (x/(x+y+z) is 0.02 to 0.23), and a molar ratio Mn/Me of Mn to the Me is 0.62 to 0.72 (z/(x+y+z) is 0.62 to 0.72), is used as an active material.

Since when a molar ratio Li/Me of Li to the transition metal element Me is less than 1.2, or the Li/Me is more than 1.6, a discharge capacity is small, the Li/Me is set to the range of 1.2 to 1.6 (a/(x+y+z) is 1.2 to 1.6) in order to attain a lithium secondary battery having a large discharge capacity.

It is preferred to select a lithium transition metal composite oxide in which the molar ratio Li/Me of Li to the transition metal element Me is 1.25 to 1.40 particularly from the viewpoint of being able to obtain a nonaqueous electrolyte secondary battery having high initial efficiency. Moreover, it is preferred to set the molar ratio Li/Me of Li to the transition metal element Me to the range of 1.250 to 1.350 in order to improve the initial efficiency and the high rate discharge performance.

Since when a molar ratio Co/Me of Co to the transition metal element Me is less than 0.02, or the Co/Me is more than 0.23, a discharge capacity is small and initial efficiency is low, the Co/Me is set to the range of 0.02 to 0.23 (x/(x+y+z) is 0.02 to 0.23) in order to attain a lithium secondary battery having a large discharge capacity and high initial efficiency. Moreover, the Co/Me is preferably 0.040 to 0.195 in order to improve the high rate discharge performance.

Since when a molar ratio Mn/Me of Mn to the transition metal element Me is less than 0.62, a discharge capacity is small, and when the Mn/Me is more than 0.72, a discharge capacity is small and initial efficiency is low, the Mn/Me is set to the range of 0.62 to 0.72 (z/(x+y+z) is 0.62 to 0.72) in order to attain a lithium secondary battery having a large discharge capacity and high initial efficiency. Moreover, the Mn/Me is preferably 0.625 to 0.707 in order to improve the high rate discharge performance.

The lithium transition metal composite oxide of the present invention is represented by the general formula described above, and is essentially a composite oxide composed of Li, Co, Ni and Mn, but it is not excluded that the lithium transition metal composite oxide contains a small amount of other metals such as alkali metals, for example, Na and Ca, alkaline earth metals, or transition metals typified by 3d transition metals such as Fe and Zn to an extent not impairing the effect of the present invention.

The lithium transition metal composite oxide of the present invention has an α-NaFeO$_2$ structure. The lithium transition metal composite oxide of the present invention can belong to P3$_1$12 or R3-m as a space group. Here, P3$_1$12 is a crystal structure model in which atom positions at 3a, 3b and 6c sites in R3-m are subdivided, and the P3$_1$12 model is employed when there is orderliness in atom arrangement in R3-m. In addition, "R3-m" should be essentially written with a bar "-" added above "3" of "R3 m".

In the present specification, the crystal structure will be described by use of Miller index serving as such as "(003) line", "(104) line", "(108 line)" and "(110) line", and these are Miller index in the case of attributed to a space group R3-m as a crystal structure model. On the other hand, in the case of attributed to a space group P3$_1$12 as a crystal structure model, the Miller indices corresponding to the above expression are respectively "(003) line", "(114) line", "(118) line" and "(300) line". Accordingly, in the case of attributed to a space group P3$_1$12 as a crystal structure model, the expression of "(104) line" in the present specification is read as "(114) line", the expression of "(108) line" is read as "(118) line", and the expression of "(110) line" is read as "(300) line".

The lithium transition metal composite oxide of the present invention is, as described above, characterized by being observed as a single phase attributed to a space group R3-m on an X-ray diffraction chart when the lithium transition metal composite oxide is electrochemically oxidized up to a potential of 5.0 V (vs. Li/Li$^+$). Thereby, a nonaqueous electrolyte secondary battery having excellent charge-discharge cycle performance can be obtained, as shown in Examples described later.

Here, "when the lithium transition metal composite oxide is electrochemically oxidized up to a potential of 5.0 V (vs. Li/Li$^+$)" may be when an electrochemical cell provided with an electrode containing an active material for a nonaqueous electrolyte secondary battery containing a lithium transition metal composite oxide as a working electrode, and a counter electrode, a reference electrode and an electrolyte is configured, and a potential of the working electrode relative to a potential of the reference electrode composed of lithium metal is set to 5.0 V, and the specific condition may be as is described in Examples described later.

Further, in order to satisfy the requirement of "being observed as a single phase attributed to a space group R3-m on an X-ray diffraction chart", it is enough that a diffraction pattern obtained by X-ray diffraction measurement attributes to a space group R3-m and that split is not visually observed in a peak attributed to Miller index (003) line when a peak exhibiting the maximum intensity in the diffraction pattern is drawn so as to fall within a full scale of a diffraction chart. A common apparatus like an X-ray diffraction measurement apparatus using a CuKα radiation source can be used for this measurement. When the CuKα radiation source is used, the peak attributed to the Miller index (003) line is observed around 19°. Although in measurement in Comparative Example 1-1 described later, SPring-8 was employed, such a measurement method or measurement condition need not be necessarily employed, and by employing a common apparatus like an X-ray diffraction measurement apparatus using a CuKα radiation source as employed in other Examples or Comparative Examples, it is possible to distinguish whether "the lithium transition metal composite oxide is observed as a single phase attributed to a space group R3-m on an X-ray diffraction chart", or not.

In addition, the lithium transition metal composite oxide of the present invention can also be defined as "being observed as a single phase of a hexagonal crystal structure on an X-ray diffraction chart", but since X-ray diffraction is performed in a charge state, if the lithium transition metal composite oxide is a single phase of a hexagonal crystal structure, it attributes to a space group R3-m. The single phase of the hexagonal crystal structure attributes to a space group P3$_1$12 immediately after synthesis.

Moreover, in the present invention, it is required that an oxygen position parameter, determined by crystal structure analysis by a Rietveld method based on an X-ray diffraction pattern, is 0.260 or less. When the oxygen position parameter is 0.260 or less, a nonaqueous electrolyte secondary battery having excellent high rate discharge performance can be attained. In addition, as shown in Examples described later, the positive active material in a state of a discharge end is used for a sample to be subjected to X-ray diffraction measurement for obtaining an X-ray diffraction pattern which forms a foundation for determining an oxygen position parameter. Accordingly, when an oxygen position parameter is evaluated on the active material for a nonaqueous electrolyte secondary battery contained in a positive electrode obtained by disassembling a nonaqueous electrolyte battery, it is necessary to previously bring the nonaqueous electrolyte secondary battery into a state of a discharge end by low rate discharge before disassembling the battery. Further, since a material of an active material after synthesis, that is, a material of an active material before used for an electrode for a nonaqueous electrolyte secondary battery, can be said to be in a state of a discharge end, the active material may be directly subjected to X-ray diffraction measurement as-is when an oxygen position parameter is evaluated on the active material.

Figure 6:
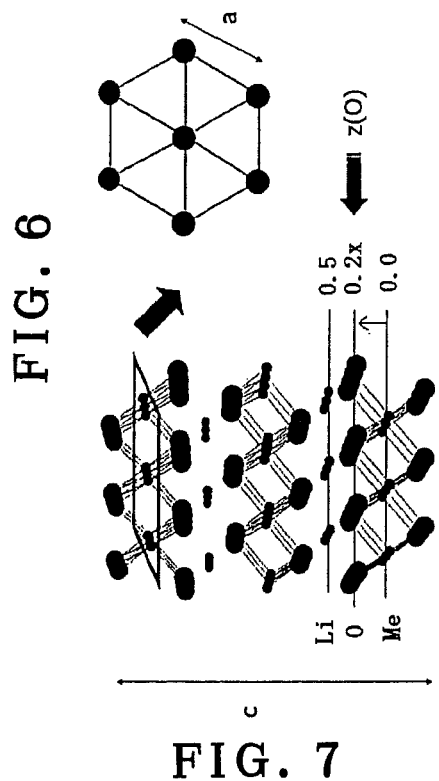
FIG. 6 is a reference view for explaining an oxygen position parameter.

In the present specification, the oxygen position parameter refers to a value of z at the time when with respect to a crystal structure of an α-NaFeO$_2$ type of a lithium transition metal composite oxide attributed to a space group R3-m, a space coordinate of Me (transition metal) is defined as (0, 0, 0), a space coordinate of Li (lithium) is defined as (0, 0, ½), and a space coordinate of O (oxygen) is defined as (0, 0, z). That is, the oxygen position parameter is a relative mark indicating how far an O (oxygen) position is from a Me (transition metal) position. FIG. 6 is shown as a reference drawing.

In the present invention, a BET specific surface area is preferably 0.88 m$^2$/g or more, and more preferably 1.24 to 5.87 m$^2$/g in order to obtain a lithium secondary battery having excellent initial efficiency and excellent high rate discharge performance.

A tapped density is preferably 1.25 g/cm$^3$ or more, and more preferably 1.44 g/cm$^3$ or more particularly in order to obtain a lithium secondary battery having excellent high rate discharge performance.

The positive active material of the present invention is characterized in that oxygen gas is not generated from the above lithium transition metal composite oxide when charge is performed up to any potential within the range of 4.5 to 4.6 V (vs. Li/Li$^+$) as a maximum achieved potential of a positive electrode. Since in a conventional positive active materials, as shown in Patent Documents 11, 12, and Non-patent Documents 3, 4, when the lithium transition metal composite oxide is a lithium-excess transition metal composite oxide, a maximum achieved potential of a positive electrode is about 4.5 V (vs. Li/Li$^+$) and oxygen gas is generated from the composite oxide at this potential, it is said that the positive active material of the present invention is completely different from the conventional positive active materials. In the present invention, it has been confirmed that oxygen gas is not generated from the lithium transition metal composite oxide when charge is performed up to each potential of 4.5 V, 4.55 V, and 4.6 V (vs. Li/Li$^+$) as a maximum achieved potential of a positive electrode, as shown in Examples described later.

In the present invention, "oxygen gas is not generated" means that oxygen gas is not substantially generated, and specifically, a volume ratio (O$_2$/(N$_2$+O$_2$)) of oxygen to the total amount of nitrogen and oxygen is preferably 0.20 to 0.50, and more preferably 0.20 to 0.25 in the case where a sealed battery containing a positive active material with the composition of the present invention is prepared, and charge is performed up to any potential within the range of 4.5 to 4.6 V (vs. Li/Li$^+$) and discharge is performed up to 2.0 V (vs. Li/Li$^+$), and then the battery is disassembled and gas released from the battery inside is analyzed by using gas chromatography. It is particularly preferred that a volume ratio between oxygen and nitrogen is not different (measurement error: ±5%) from an atmospheric component (O$_2$/(N$_2$+O$_2$)=0.21), that is, an amount of generated oxygen gas is below the detection limit. In addition, charge-discharge of the battery is performed at ordinary temperature (25° C.) and is not performed in an extremely heated state.

When as described above, the maximum achieved potential of a positive electrode is within the range of 4.5 to 4.6 V (vs. Li/Li$^+$), oxygen gas is not generated even if charge is performed up to any potential, but when the charge is performed as the charge in the initial formation (initial charge-discharge) in a manufacturing step of a lithium secondary battery, charge is preferably performed up to any potential within the range of more than 4.5 V (vs. Li/Li$^+$) and less than 4.6 V (vs. Li/Li$^+$) as the maximum achieved potential of a positive electrode, and more preferably performed up to 4.55 V or a potential close to 4.55 V.

When the maximum achieved potential of a positive electrode is 4.5 V (vs. Li/Li$^+$) or less, a discharge capacity is small in a discharge region of 4.3 V (vs. Li/Li$^+$) or less, and when the maximum achieved potential of a positive electrode is 4.6 V (vs. Li/Li$^+$) or more, an amount of gas generated through decomposition of an electrolyte solution is increased though the discharge capacity is increased, resulting in the deterioration of battery performance, and therefore these ranges are not preferred.

When charge up to 4.55 V (vs. Li/Li$^+$) as the maximum achieved potential of a positive electrode is performed as the charge in the initial charge-discharge (first charge-discharge) as in Example described later, a lithium secondary battery can be manufactured without generating oxygen gas, and the lithium secondary battery thus manufactured can attain a large discharge capacity when a charge method, in which the maximum achieved potential of a positive electrode at the time of charge is 4.3 V (vs. Li/Li$^+$), is employed at the time of use.

Figure 9:
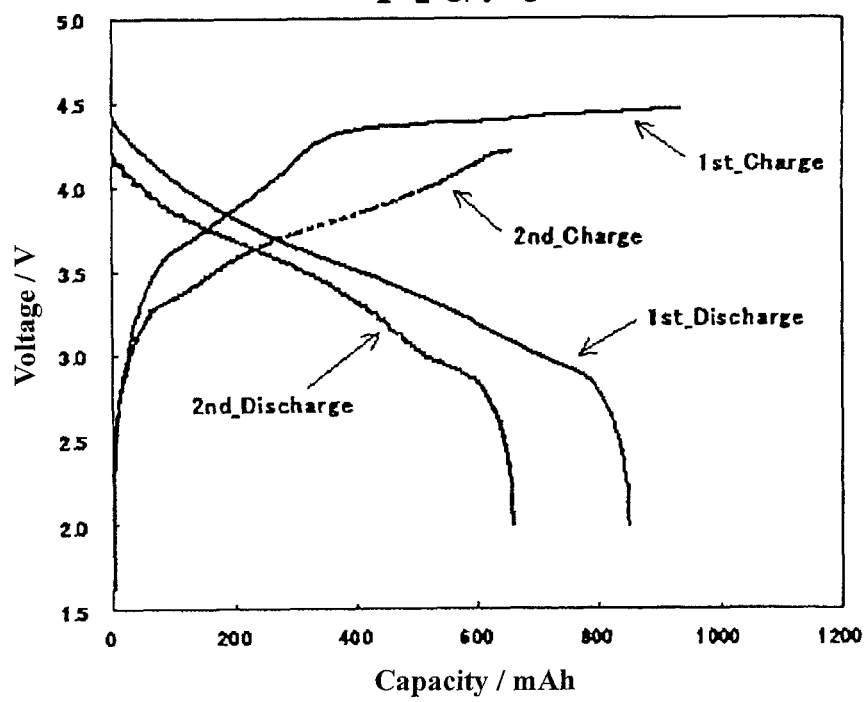
FIG. 9 is a view showing potential behavior during an initial charge-discharge step of a battery 2 in Example 3.

Further, the positive active material of the present invention has a plateau potential in a charge range, and any potential within the range of 4.5 to 4.6 V (vs. Li/Li$^+$) is the plateau potential or more. Here, the plateau potential means "a region where a potential change appearing to the amount of charge in the range of a positive electrode potential is relatively flat" as shown in FIG. 9 of Patent Document 1, and has the same meaning as that described in Patent Document 11.

The present invention is characterized in that oxygen gas is not substantially generated from a lithium transition metal composite oxide even when charge is performed at a plateau potential or more in initial charge-discharge (first charge-discharge) of a lithium secondary battery using the positive active material which contains a lithium transition metal composite oxide having a molar ratio Li/Me of Li to all transition metal elements Me (Co, Ni and Mn) of 1.25 to 1.40, and has the plateau potential in the charge range.

Next, a method of manufacturing an active material for a nonaqueous electrolyte secondary battery of the present invention will be described.

The active material for a nonaqueous electrolyte secondary battery of the present invention can be obtained basically by adjusting a raw material so as to contain metal elements (Li, Mn, Co, Ni) composing the active material just as the intended composition of the active material (lithium transition metal composite oxide), and finally sintering the raw material. However, an amount of a Li material loaded is preferably excessive by about 1 to 5% considering that a part of the Li material is disappeared during sinter.

As a method for preparing a lithium transition metal composite oxide having the intended composition, the so-called "solid state method" in which salts of Li, Co, Ni, and Mn are mixed and sintered, and "coprecipitation method" in which a coprecipitated precursor in which Co, Ni, and Mn exist in one particle is previously prepared, and the precursor is mixed with a Li salt and the resulting mixture is sintered are known. In a synthesis process by the "solid state method", particularly Mn is hard to be homogeneously solid soluted in Co or Ni. Therefore, it is difficult to obtain a sample in which the respective elements are distributed homogeneously in one particle. In producing the active material for a nonaqueous electrolyte secondary battery of the present invention, selection of the "solid state method" and "coprecipitation method" is not particularly limited. However, when the "solid state method" is selected, it is extremely difficult to produce the positive active material of the present invention. Selection of the "coprecipitation method" is preferred in that an active material in which each element distribution is more homogeneous can be easily obtained.

In preparing the coprecipitated precursor, since Mn among Co, Ni and Mn is easily oxidized, and it is not easy to prepare the coprecipitated precursor in which Co, Ni and Mn are homogeneously distributed in a divalent state, uniform mixing of Co, Ni and Mn at an element level tends to be insufficient. Particularly, in the range of the composition of the present invention, a ratio of Mn is larger than those of Co and Ni, it is important to remove dissolved oxygen in an aqueous solution. A method of removing dissolved oxygen includes a method of bubbling a gas not containing oxygen. The gas not containing oxygen is not particularly limited, and nitrogen gas, argon gas, carbon dioxide ($CO_2$) can be used. Particularly in the case where a coprecipitated carbonate precursor is prepared as in Example described later, if carbon dioxide is employed as the gas not containing oxygen, it is preferred since an environment in which carbonate is easily produced is provided.

A pH in the step of coprecipitating a compound containing Co, Ni and Mn in a solution to produce a precursor is not limited, and the pH can be 8.5 to 11 when the coprecipitated precursor is prepared as a coprecipitated carbonate precursor. In order to increase a tapped density, it is preferred to control a pH. When the pH is adjusted to 9.4 or less, the tapped density can be 1.25 g/cm$^3$ or more to improve the high rate discharge performance.

For preparation of the coprecipitation hydroxide precursor, a compound is preferable in which Mn, Ni and Co are homogeneously mixed. However, the precursor is not limited to a hydroxide and besides, an insoluble salt in which elements homogeneously exist at an element level, such as a carbonate or a citrate, can be used similarly to a hydroxide. A precursor having a higher bulk density can also be prepared by using a crystallization reaction or the like using a complexing agent. At this time, by mixing and calcinating with a Li source and a Na source, an active material having a high density and a small specific surface area can be obtained, and therefore the energy density per electrode area can be improved.

Examples of the raw material of the coprecipitation hydroxide precursor may include manganese oxide, manganese carbonate, manganese sulfate, manganese nitrate and manganese acetate as a Mn compound, nickel hydroxide, nickel carbonate, nickel sulfate and nickel acetate as a Ni compound, and cobalt sulfate, cobalt nitrate and cobalt acetate as a Co compound.

As a raw material for preparation of the coprecipitation hydroxide precursor, a material in any form can be used as long as it forms a precipitation reaction with an aqueous alkali solution, but it is preferable that a metal salt having a high solubility be used.

The active material for a lithium secondary battery in the present invention can be suitably prepared by mixing the coprecipitation hydroxide precursor with a Li compound, followed by heat-treating the mixture. The active material can be suitably produced by using lithium hydroxide, lithium carbonate, lithium nitrate, lithium acetate or the like as a Li compound.

For obtaining an active material, which has a high reversible capacity, selection of the sintering temperature is very important.

If the sintering temperature is too high, the obtained active material is collapsed with an oxygen release reaction, a phase defined as a $Li[Li_{1/3}Mn_{2/3}]O_2$ type of a monoclinic crystal, in addition to a hexagonal crystal as a main phase tends to be observed as a separate phase rather than a solid solution phase, and such a material is not preferable because the reversible capacity of the active material significantly decreases. Therefore, it is important to ensure that the sintering temperature is lower than a temperature at which the oxygen release reaction of the active material is influential. The oxygen release temperature of the active material is generally 1000° C. or higher in the composition range according to the present invention, but since the oxygen release temperature slightly varies depending on the composition of the active material, it is preferable to check the oxygen release temperature of the active material beforehand. Particularly, it should be noted that the oxygen release temperature has been found to shift toward the low temperature side as the amount of Co contained in the active material increases. As a method for checking the oxygen release temperature of the active material, a mixture of a coprecipitation precursor with $LiOH.H_2O$ may be subjected to thermogravimetric analysis (DTA-TG measurement) for simulating a sinter reaction process, but in this method, platinum used in a sample chamber of a measuring instrument may be corroded by a volatilized Li component to damage the instrument, and therefore a composition that is crystallized on some level beforehand by employing a sintering temperature of about 500° C. should be subjected to thermogravimetric analysis.

On the other hand, if the sintering temperature is too low, crystallization does not sufficiently proceed, and active material characteristics are significantly degraded, thus being not preferable. The sintering temperature is required to be at least 800° C. Sufficient crystallization is important for reducing the resistance of a crystal grain boundary to facilitate smooth transportation of lithium ions. Examples of the method for determining the degree of crystallization include visual observation using an scanning electron microscope. The positive active material of the present invention was observed with a scanning electron microscope to find that the positive active material was formed of nano-order primary particles at the active material synthesis temperature of 800° C. or lower, but was crystallized to a sub-micron level by further elevating the active material synthesis temperature, and large primary particles leading to improvement of active material characteristics could be obtained.

The inventors precisely analyzed the half width of the active material of the present invention to find that a strain remained in a lattice in the active material synthesized at a temperature of up to 800° C., and the strain could be mostly removed by synthesizing the active material at a higher temperature. The size of the crystallite was increased proportionally as the synthesis temperature was elevated. Therefore, in the composition of the active material of the present invention, a good discharge capacity was also obtained by aiming for particles in which the strain of the lattice is little present in a lattice, and the crystallite size is sufficiently grown. Specifically, it has been found that it is preferable to employ such a synthesis temperature (sintering temperature) that the amount of strain having an effect on the lattice constant is 1% or less, and the crystallite size is grown to 100 nm or more. When these particles are molded as an electrode and charge-discharge is performed, a change occurs due to expansion and contraction, but it is preferable for effect of present invention that the crystallite size to be kept at 50 nm or more even in a charge-discharge process. That is, an active material having an excellent initial efficiency and a high reversible capacity can be obtained only by selecting the calcination temperature so as to be as close as possible to the above-described oxygen release temperature of the active material.

As described above, while a preferred sintering temperature varies depending on an oxygen-release temperature of the active material and therefore it is difficult to set a preferred range of the sintering temperature comprehensively, in the present invention, and it is preferred to set the sintering temperature to the range of 800 to 1000° C. in order to make the discharge capacity sufficient when the molar ratio Li/Me is 1.2 to 1.6. Speaking more, the sintering temperature is preferably around 800 to 940° C. when the molar ratio Li/Me is below 1.5, and is preferably around 1000° C. when the molar ratio Li/Me is 1.5 to 1.6.

The nonaqueous electrolyte used in the nonaqueous electrolyte secondary battery according to the present invention is not limited, and those that are generally proposed to be used in lithium batteries and the like can be used. Examples of the nonaqueous solvent used in the nonaqueous electrolyte may include, but are not limited to, cyclic carbonates such as propylene carbonate, ethylene carbonate, butylene carbonate, chloroethylene carbonate and vinylene carbonate; cyclic esters such as γ-butyrolactone and γ-valerolactone; chain carbonates such as dimethyl carbonate, diethyl carbonate and ethylmethyl carbonate; chain esters such as methyl formate, methyl acetate and methyl butyrate; tetrahydrofuran or derivatives thereof; ethers such as 1,3-dioxane, 1,4-dioxane, 1,2-dimethoxyethane, 1,4-dibutoxyethane and methyl diglyme; nitriles such as acetonitrile and benzonitrile; dioxolane or derivatives thereof; and ethylene sulfide, sulfolane, sultone or derivatives thereof alone or mixtures of two or more thereof.

Examples of the electrolyte salt used in the nonaqueous electrolyte include inorganic ion salts including one of lithium (Li), sodium (Na) and potassium (K), such as $LiClO_4$, $LiBF_4$, $LiAsF_6$, $LiPF_6$, $LiSCN$, $LiBr$, $LiI$, $Li_2SO_4$, $Li_2B_{10}Cl_{10}$, $NaClO_4$, $NaI$, $NaSCN$, $NaBr$, $KClO_4$ and $KSCN$, and organic ion salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phtalate, lithium stearylsulfonate, lithium octylsulfonate and lithium dodecylbenzenesulfonate, and these ionic compounds can be used alone or in combination of two or more thereof.

Further, by mixing $LiPF_6$ or $LiBF_4$ with a lithium salt having a perfluoroalkyl group, such as $LiN(C_2F_5SO_2)_2$, the viscosity of the electrolyte can be further reduced, so that the low-temperature characteristics can be further improved, and self discharge can be suppressed, thus being more desirable.

A salt that is melted at ordinary temperature or an ion liquid may be used as a nonaqueous electrolyte.

The concentration of the electrolyte salt in the nonaqueous electrolyte is preferably 0.1 mol/l to 5 mol/l, further preferably 0.5 mol/l to 2.5 mol/l for reliably obtaining a nonaqueous electrolyte battery having high battery characteristics.

The negative electrode material is not limited, and may be freely selected as long as it can precipitate or absorb lithium ions. Examples thereof include titanium-based materials such as lithium titanate having a spinel-type crystal structure represented by $Li[Li_{1/3}Ti_{5/3}]O_4$, alloy-based materials such as Si-, Sb- and Sn-based alloy materials, lithium metals, lithium alloys (lithium metal-containing alloys such as lithium-silicon, lithium-aluminum, lithium-lead, lithium-tin, lithium-aluminum-tin, lithium-gallium and wood alloys), lithium composite oxides (lithium-titanium) and silicon oxide as well as alloys capable of absorbing/releasing lithium, and carbon materials (e.g., graphite, hard carbon, low temperature-fired carbon and amorphous carbon).

It is desirable that the powder of the positive active material and the powder of the negative electrode material have an average particle size of 100 μm or less. Particularly, it is desirable that the powder of the positive active material have a size of 10 μm or less for the purpose of improving the high power characteristics of the nonaqueous electrolyte battery. A crusher and a classifier are used for obtaining a powder in a predetermined shape. For example, a mortar, a ball mill, a sand mill, a vibration ball mill, a planet ball mill, a jet mill, a counter jet mill, a revolving airflow-type jet mill, a sieve or the like is used. At the time of crushing, wet crushing can also be used in which water, or an organic solvent such as hexane coexists. The classification method is not particularly limited, and a sieve, an air classifier or the like is used as necessary in both dry and wet processes.

The positive active material and the negative electrode material which are main components of the positive electrode and the negative electrode have been described in detail above, but the positive electrode and negative electrode may contain, in addition to the main components, a conducting agent, a binder, a thickener, a filler and the like as other components.

The conducting agent is not limited as long as it is an electron-conductive material that has no adverse effect on battery performance, but normally conductive materials such as natural graphite (scaly graphite, flake graphite, earthy graphite, etc.), artificial graphite, carbon black, acetylene black, ketjen black, carbon whisker, carbon fibers, metal (copper, nickel, aluminum, silver, gold, etc.) powders, metal fibers and conductive ceramic materials can be included alone or as a mixture thereof.

Among them, acetylene black is desirable as a conducting agent from the viewpoints of electron conductivity and coating properties. The added amount of the conducting agent is preferably 0.1% by weight to 50% by weight, especially preferably 0.5% by weight to 30% by weight based on the total weight of the positive electrode or negative electrode. Particularly, use of acetylene black crushed into ultrafine particles of 0.1 to 0.5 μm is desirable because the required amount of carbon can be reduced. These mixing methods involve physical mixing, the ideal of which is homogeneous mixing. Thus, mixing can be carried out in a dry process or a wet process using a powder mixer such as a V-type mixer, an S-type mixer, a grinder, a ball mill or a planet ball mill.

As the binder, thermoplastic resins such as polytetrafluoroethylene (PTFE), polyvinylidene fluoride (PVDF), polyethylene and polypropylene, and polymers having rubber elasticity, such as ethylene-propylene-diene terpolymer (EPDM), sulfonated EPDM, styrene-butadiene rubber (SBR) and fluororubber can normally be used alone or as a mixture of two or more thereof. The added amount of the binder is preferably 1 to 50% by weight, especially preferably 2 to 30% by weight based on the total weight of the positive electrode or negative electrode.

The filler may be any material as long as it has no adverse effect on battery performance. An olefin-based polymer such as polypropylene or polyethylene, amorphous silica, alumina, zeolite, glass, carbon or the like is normally used. The added amount of the filler is preferably 30% by weight or less based on the total amount of the positive electrode or the negative electrode.

The positive electrode and the negative electrode are suitably prepared by kneading the aforementioned main components (positive active material in the positive electrode and negative electrode material in the negative electrode) and other materials to form a mixture, and mixing the mixture with an organic solvent, such as N-methylpyrrolidone or toluene, or water, followed by applying or contact-bonding the resulting mixed liquid onto a current collector that is described in detail below, and carrying out a heating treatment at a temperature of about 50° C. to 250° C. for about 2 hours. For the applying method, for example, it is desirable to perform applying in any thickness and any shape using means such as roller coating by an applicator roll or the like, screen coating, a doctor blade system, spin coating or a bar coater, but the applying method is not limited thereto.

As a separator, it is preferable that a porous membrane, a nonwoven fabric or the like, which shows excellent high rate discharge performance, be used alone or in combination. Examples of the material that forms the separator for a nonaqueous electrolyte battery may include polyolefin-based resins represented by polyethylene, polypropylene and the like, polyester-based resins represented by polyethylene terephthalate, polybutylene terephthalate and the like, polyvinylidene fluoride, vinylidene fluoride-hexafluoropropylene copolymers, vinylidene fluoride-perfluoro vinyl ether copolymers, vinylidene fluoride-tetrafluoroethylene copolymers, vinylidene fluoride-trifluoroethylene copolymers, vinylidene fluoride-fluoroethylene copolymers, vinylidene fluoride-hexafluoroacetone copolymers, vinylidene fluoride-ethylene copolymers, vinylidene fluoride-propylene copolymers, vinylidene fluoride-trifluoropropylene copolymers, vinylidene fluoride-tetrafluoroethylene-hexafluoropropylene copolymers and vinylidene fluoride-ethylene-tetrafluoroethylene copolymers.

The porosity of the separator is preferably 98% by volume or less from the viewpoint of the strength. The porosity is preferably 20% by volume or more from the viewpoint of charge-discharge characteristics.

For the separator, for example, a polymer gel formed of acrylonitrile, ethylene oxide, propylene oxide, methyl methacrylate, vinyl acetate, vinyl pyrrolidone or a polymer such as poly(fluoride vinylidene) and an electrolyte may be used. Use of the nonaqueous electrolyte in a gel form as described above is preferable from the viewpoint of being effective to prevent liquid leakage.

Further, for the separator, use of the porous membrane, nonwoven fabric or the like in combination with the polymer gel is desirable because liquid retainability of the electrolyte is improved. That is, a film with the surface and the microporous wall face of a polyethylene microporous membrane coated with a solvophilic polymer in a thickness of several μm or less is formed, and an electrolyte is held within micropores of the film, so that the solvophilic polymer is formed into a gel.

Examples of the solvophilic polymer include, in addition to poly(fluoride vinylidene), polymers in which an acrylate monomer having an ethylene oxide group, an ester group or the like, an epoxy monomer, a monomer having an isocyanate group, or the like is crosslinked. The monomer can be subjected to a crosslinking reaction by carrying out heating or using ultraviolet rays (UV) while using a radical initiator at the same time, or using active light rays such as electron beams (EB), or the like.

The configuration of the nonaqueous electrolyte secondary battery is not particularly limited, and examples thereof include a cylindrical battery having a positive electrode, a negative electrode and a roll-shaped separator, a prismatic battery and a flat battery.

Both the conventional positive active material and the active material of the present invention are capable of charge-discharge at a positive electrode potential of around 4.5 V (vs. Li/Li$^+$). However, depending on the type of using nonaqueous electrolyte, the nonaqueous electrolyte may be oxidatively decomposed to cause deterioration of battery performance because the positive electrode potential during charge is too high. A nonaqueous electrolyte secondary battery, with which a sufficient discharge capacity is obtained even when such a charge method that the maximum potential of the positive electrode during charge is 4.3 V (vs. Li/Li$^+$) or less is employed at the time of operation, may be required. If the active material of the present invention is used, a discharge electrical amount, which exceeds the capacity of the conventional positive active material, i.e., about 200 mAh/g, can be obtained even when such a charge method that the maximum potential of the positive electrode during charge is lower than 4.5 V (vs. Li/Li$^+$), for example, 4.4 (vs. Li/Li$^+$) or less or 4.3 (vs. Li/Li$^+$) or less is employed at the time of user operation.

For the positive active material according to the present invention to have a high discharge capacity, the ratio, at which transition metal elements that form a lithium-transition metal composite oxide are present in areas other than transition metal sites of a layered rock-salt-type crystal structure, is preferably low. This can be achieved by ensuring that in precursor particles that are subjected to a sintering step, transition metal elements such as Co, Ni and Mn in precursor are sufficiently homogeneously distributed, and selecting suitable conditions for the sintering step for promoting crystallization of an active material. If distribution of transition metals in precursor core particles that are subjected to the sintering step is not homogeneous, a sufficient discharge capacity is not obtained. The reason for this is not necessarily clear, but the present inventors infer that this results from occurrence of so called cation mixing in which the obtained lithium-transition metal composite oxide has some of transition metal elements present in areas other than transition metal sites of the layered rock-salt-type crystal structure, i.e., lithium sites if the distribution of transition metals in precursor core particles that are subjected to the sintering step is not homogeneous. A similar inference can be applied in a crystallization process in the sintering step, wherein cation mixing in the layered rock-salt-type crystal structure easily occurs if crystallization of the active material is insufficient. Those in which the homogeneity of the distribution of the transition metal elements is high tend to have a high intensity ratio of diffraction peaks of the (003) line and the (104) line when the result of X-ray diffraction measurement is attributed to a space group R3-m. In the present invention, the intensity ratio of diffraction peaks of the (003) line and the (104) line (attributed to a space group P3$_1$12 and being (114) line before charge-discharge) from X-ray diffraction measurement is preferably $I_{(003)}/I_{(104)} \geq 1.20$. The intensity ratio is preferably $I_{(003)}/I_{(104)} > 1$ in a state of complete discharge after charge-discharge. If synthesis conditions and synthesis procedures for the precursor are inappropriate, the peak intensity ratio is a smaller value, which is often less than 1.

By employing the synthesis conditions and synthesis procedures described in the specification of the present application, a positive active material having high performance as described above can be obtained. Particularly, there can be provided a positive active material for a nonaqueous electrolyte secondary battery with which a high discharge capacity can be obtained even when the charge upper limit potential of positive electrode is set to lower than 4.5, e.g., a charge upper limit potential such as 4.4 V or 4.3 V is set.

Example 1

Example 1-1

4.6873 g of cobalt sulfate heptahydrate, 6.5743 g of nickel sulfate hexahydrate and 22.110 g of manganese sulfate pentahydrate were weighed, and dissolved in 200 ml of ion-exchanged water to prepare a 0.67 M aqueous sulfate solution of which the molar ratio of Co:Ni:Mn was 12.5:18.75:68.75. On the other hand, 750 ml of ion-exchanged water was poured into a 2 dm$^3$ reaction tank, and CO$_2$ was dissolved in the ion-exchanged water by bubbling CO$_2$ gas for 30 minutes in the ion-exchanged water. A temperature of the reaction tank was set to 50° C. (±2° C.), and the aqueous sulfate solution was added dropwise at a rate of 3 ml/min while stirring the content in the reaction tank at a rotational speed of 700 rpm using a paddle blade equipped with a stirring motor. Here, from the start of the dropwise addition until the completion thereof, an aqueous solution containing 0.67 M of sodium carbonate and 0.067 M of ammonia was appropriately added dropwise to control the content in the reaction tank so as to always maintain a pH of 8.6 (±0.05). After the completion of the dropwise addition, the stirring was continued for further one hour. After the stirring was stopped, the solution was left standing for 12 hours or more.

Next, using a suction filtration apparatus, particles of coprecipitated carbonate salt produced in the reaction tank were separated, sodium ions adhering to the particles were cleaned and removed with ion-exchange water, and the resulting particles were dried at 100° C. under ordinary pressure in an air atmosphere by using an electric furnace. Thereafter, particles were pulverized for several minutes by using an automatic mortar made of agate in order to level particle sizes. In this way, a coprecipitated carbonate precursor was prepared.

Lithium carbonate (0.9436 g) was added to 2.3040 g of the coprecipitated carbonate precursor, and the resulting mixture was adequately mixed by using an automatic mortar made of agate to prepare a mixed powder in which the molar ratio of Li and (Co, Ni, Mn) was 130:100. The mixed powder was molded at a pressure of 6 MPa by using a pellet molding machine to be formed into pellets with a diameter of 25 mm. The amount of the mixed powder subjected to pellet molding was determined so as to be equivalent to 2 g of a mass of an assumed final product. One of the pellets was placed on an aluminum boat having an entire length of about 100 mm, placed together with the boat in a box type electric furnace (model number: AMF 20), and sintered at 900° C. for 10 hours under ordinary pressure in an air atmosphere. Inner dimensions of the box type electric furnace were 10 cm long, 20 cm wide and 30 cm deep, and heating wires were disposed in a width direction at 20-centimeter intervals. After sintering, a heater was turned off, and the aluminum boat was naturally cooled as it was left standing in the furnace. Consequently, a temperature of the furnace was lowered to about 200° C. after 5 hours, but a subsequent temperature lowering rate was slightly mild. After a elapse of a whole day and night, it was confirmed that a temperature of the furnace was 100° C. or lower, and then the pellet was taken out and pulverized for several minutes by using an automatic mortar made of agate in order to level particle sizes. In this way, a lithium transition metal composite oxide of Example 1-1 was prepared.

As a result of composition analysis, the obtained lithium transition metal composite oxide had the composition of $Li_{1.13}Co_{0.11}Ni_{0.16}Mn_{0.60}O_2$. Further, as a result of powder X-ray diffraction measurement using a $CuK_\alpha$ radiation, a hexagonal crystal structure of an $\alpha$-$NaFeO_2$ type was identified as a main phase.

Comparative Example 1-1

An aqueous sulfate solution, in which the respective elements Co, Ni, and Mn were dissolved in the molar ratio of 12.5:18.75:68.75, was prepared. On the other hand, a temperature of a reaction tank poured with ion-exchange water was maintained at 70° C., and to the ion-exchange water, an aqueous NaOH solution was added dropwise to adjust a pH to 10.3. Next, dissolved oxygen was removed by bubbling an inert gas. An outlet was fixed in this reaction tank so that a solution was ejected from the outlet if a liquid level in the reaction tank exceeded a certain height. Further, a stirring blade was disposed in the reaction tank, and a cylindrical convection plate was fixed in the reaction tank in order to cause convection in a vertical direction during stirring the solution. The aqueous sulfate solution was added dropwise at a feed rate of 11.5 ml/min while stirring the content in the reaction tank. A part of a solution containing a reaction product was ejected out of the reaction tank from the outlet during the aqueous sulfate solution was added dropwise, but the ejected solution was discarded without being returned to the reaction tank before the dropwise addition of all of the sulfate aqueous solution was completed. While the dropwise addition was continued, the temperature of the reaction tank was maintained at 70° C., and an aqueous NaOH solution was appropriately added dropwise while monitoring a pH so that the pH always fell within the range of 10.3±0.1. After the completion of the dropwise addition, the stirring was stopped and the solution was left standing for 12 hours or more. Next, the resulting coprecipitated product was separated by filtration and dried at 140° C. under ordinary pressure in an air atmosphere by using an oven. After drying, the coprecipitated product was pulverized lightly to an extent of leveling particle sizes. Thereby, a dried powder was obtained.

Lithium hydroxide was added to the obtained dried powder so as to have the molar ratio of Li and (Co+Ni+Mn) of 150:100, and ethanol was further added, and the resulting mixture was wet-mixed. About 5 kg of the resulting mixture was transferred to a sagger, and placed with the sagger in a furnace and sintered at 1000° C. After a temperature of the furnace was returned to ordinary temperature, a sintered product was taken out and pulverized to an extent of leveling particle sizes by using a mortar. In this way, a lithium transition metal composite oxide of Comparative Example 1-1 was prepared.

As a result of composition analysis, the obtained lithium transition metal composite oxide had the composition of $Li_{1.2}Co_{0.1}Ni_{0.15}Mn_{0.55}O_2$. Further, as a result of powder X-ray diffraction measurement using a $CuK_\alpha$ radiation, a hexagonal crystal structure of an $\alpha$-$NaFeO_2$ type was identified as a main phase.

Comparative Example 1-2

Lithium carbonate ($Li_2CO_3$), cobalt hydroxide (Co(OH)$_2$), nickel hydroxide (Ni(OH)$_2$) and manganese oxyhydroxide (MnOOH) were weighed so as to have the ratio of 150:12.5:18.75:68.75 of the respective elements Li, Co, Ni, and Mn, and these raw materials were adequately mixed and pulverized using a mortar. Next, 2 g of the resulting mixture was sintered at 1000° C. for 12 hours in the air. In this way, a lithium transition metal composite oxide of Comparative Example 1-2 was obtained.

As a result of composition analysis, the obtained lithium transition metal composite oxide had the composition of $Li_{1.2}Co_{0.1}Ni_{0.15}Mn_{0.55}O_2$. Further, as a result of powder X-ray diffraction measurement using a $CuK_\alpha$ radiation, a hexagonal crystal structure of an $\alpha$-$NaFeO_2$ type was identified as a main phase.

Comparative Example 1-3

Lithium carbonate ($Li_2CO_3$), cobalt hydroxide (Co(OH)$_2$), nickel hydroxide (Ni(OH)$_2$) and manganese oxyhydroxide (MnOOH) were weighed so as to have the ratio of 130:12.6:18.4:69.0 of the respective elements Li, Co, Ni, and Mn, and these raw materials were adequately mixed and pulverized using a mortar. Next, 2 g of the resulting mixture was sintered at 900° C. for 10 hours in the air. In this way, a lithium transition metal composite oxide of Comparative Example 1-3 was obtained.

As a result of composition analysis, the obtained lithium transition metal composite oxide had the composition of $Li_{1.13}Co_{0.11}Ni_{0.16}Mn_{0.60}O_2$. Further, as a result of powder X-ray diffraction measurement using a $CuK_\alpha$ radiation, a hexagonal crystal structure of an $\alpha$-$NaFeO_2$ type was identified as a main phase.

(Assembling and Evaluation of Nonaqueous Electrolyte Secondary Battery)

Each of the lithium transition metal composite oxides in Example 1-1 and Comparative Examples 1-1 to 1-3 was used as a positive active material for a nonaqueous electrolyte secondary battery, and a nonaqueous electrolyte secondary battery was assembled by the following procedure, and battery characteristics thereof were evaluated.

A positive active material, acetylene black (AB) and polyvinylidene fluoride (PVdF) were respectively mixed in a mass ratio of 85:8:7. To this, N-methylpyrrolidone as a dispersion medium was added, and the resulting mixture was kneaded/dispersed to prepare a applying paste. In addition, a mass ratio of the PVdF was shown on a solid mass basis since a liquid in which a solid content was dissolved/dispersed was used. The applying paste was applied onto an aluminum foil current collector having a thickness of 20 μm to prepare a positive electrode plate.

A lithium metal was used for a counter electrode (negative electrode) in order to observe the behavior of the positive electrode alone. The lithium metal was closely attached to a nickel foil current collector. However, it was prepared in such a manner that the capacity of the nonaqueous electrolyte secondary battery was controlled adequately by the positive electrode.

As an electrolyte solution, a solution obtained by dissolving $LiPF_6$, so as to have a concentration of 1 mol/l, in a mixed solvent in which a volume ratio of EC/EMC/DMC was 6:7:7 was used. A microporous membrane made of polypropylene, in which an electrolyte-retainbility was improved by surface modification using polyacrylate, was used as a separator. A nickel plate, to which a lithium metal foil was attached, was used as a reference electrode. A metal-resin composite film made of polyethylene terephthalate (15 μm)/aluminum foil (50 μm)/metal-adhesive polypropylene film (50 μm) was used for a outer case. The respective electrodes were housed in the outer case in such a way that open ends of a positive electrode terminal, a negative electrode terminal and a reference electrode terminal were exposed to outside. And fusion margins with the inner surfaces of the aforementioned metal resin composite films facing each other were airtightly sealed except a portion forming an electrolyte solution filling hole.

On the nonaqueous electrolyte secondary batteries thus assembled, an initial charge-discharge step of two cycles was performed at 25° C. The voltage control was all performed for a positive electrode potential. Charge was constant current-constant voltage charge with a current of 0.1 CmA and a voltage of 4.6 V. The charge termination condition was set at a time point at which the current value decreased to 0.02 CmA. Discharge was constant current discharge under the conditions of a current of 0.1 CmA and a final voltage of 2.0 V. In all the cycles, a rest time of 30 minutes was set after charge and after discharge.

Subsequently, a charge-discharge cycle test was performed. The voltage control was all performed for a positive electrode potential. The conditions of the charge-discharge cycle test were the same as the conditions of the above initial charge-discharge step except for setting the charge voltage to 4.3 V (vs. $Li/Li^+$). In all cycles, a rest time of 30 minutes was set after charge and after discharge. The discharge electrical quantity at the 1st cycle and the discharge electrical quantity at the 30th cycle in the charge-discharge cycle test were respectively recorded as "discharge capacity (mAh)", and a ratio of the discharge electrical quantity at the 30th cycle to the discharge electrical quantity at the 1st cycle was recorded as "capacity retention ratio (%)". The results are shown in Table 1.

TABLE 1

| | Discharge Capacity (mAh/g) | | Capacity Retention Ratio |
|---|---|---|---|
| | 1st Cycle | 30th Cycle | (%) |
| Example 1-1 | 226 | 210 | 93 |
| Comparative Example 1-1 | 203 | 166 | 82 |
| Comparative Example 1-2 | 180 | 128 | 71 |
| Comparative Example 1-3 | 157 | 102 | 65 |

As shown in Table 1, despite the adoption of "coprecipitation method" in both of Example 1-1 and Comparative Example 1-1, there was a difference in charge-discharge cycle performance. Further, there was a difference in charge-discharge cycle performance between Example 1-1 adopting "coprecipitation method" and Comparative Examples 1-2, 1-3 adopting "solid state method".

In order to investigate the causes, each of the lithium transition metal composite oxides in Example 1-1 and Comparative Examples 1-1 to 1-3 were respectively used as a positive active material for a nonaqueous electrolyte secondary battery, and a plurality of nonaqueous electrolyte secondary batteries were assembled by the above procedure. On all nonaqueous electrolyte secondary batteries assembled, initial charge was performed one time. The voltage control was all performed for a positive electrode potential. The condition of the initial charge was set to be 0.1 CmA in a current, and the charge termination condition was set at a time point at which the current value decreased to 0.02 CmA. However, with respect to the charge voltage, different charge voltages are employed for the batteries according to the same prescription. For example, in the case of Comparative Example 1-1, 9 batteries were assembled, and for 8 batteries among these batteries, charge voltages of 4.4 V, 4.5 V, 4.55 V, 4.6 V, 4.65 V, 4.7 V, 4.8 V and 5.0 V were respectively employed.

Next, all batteries including one battery which was not subjected to the initial charge were disassembled in a dry room, and the positive electrode plates were taken out. The positive electrode plates taken out from all batteries of Example 1 and Comparative Examples 2, 3 were stuck to a sample holder for measurement as-is without being washed and the like, and subjected to X-ray diffraction measurement by an X-ray diffraction apparatus (manufactured by Rigaku Corporation, model number: MiniFlex II) using a CuKα radiation source. However, in each of the positive electrode plates taken out from 9 batteries of Comparative Example 1, a positive composite was collected removing an aluminum foil current collector, and encapsulated into a tube made of Lindemann glass (manufactured by TOHO KK., length: 80 mm, outer diameter: 0.3 mm, inner diameter: 0.1 mm) without being washed and the like. X-ray diffraction measurement of this sample for measurement was carried out by using a large-scale synchrotron radiation facility SPring-8 (BL19). A wavelength used was 0.7 Å. The results of measurement are shown in FIGS. 1 to 4.

In a series of X-ray diffraction charts of Example 1-1 shown in FIG. 1, focusing on the difference between diffraction patterns, the respective charts were traced in order from an upper side pattern indicating a low potential side pattern indicating to a lower side of a high potential side, and consequently, a peak around a diffraction angle of 18° attributed to (003) line of a hexagonal crystal and a peak around a diffraction angle of 45° attributed to (104) line of a hexagonal crystal were found to be shifted to a high angle side, but a split was not yet observed when the potential reached 5.0 V. That is, in a series of X-ray diffraction charts of Example 1-1, the change in the diffraction pattern attributed to the hexagonal crystal was not found, and a crystal phase attributed to a cubic crystal did not appear even when electrochemical oxidation stage proceeded to a potential of 4.8 V or more, and further reached a potential of 5.0 V. In addition, in this measurement, since the aluminum foil current collector was not removed from the measurement sample, a peak resulting from a metal aluminum was observed around 65°.

In a series of X-ray diffraction charts of Comparative Example 1-1 shown in FIG. 2, focusing on the difference between diffraction patterns, the respective charts were traced in order from an upper side pattern indicating a low potential side to a lower side pattern indicating a high potential side, and consequently, a peak around a diffraction angle of 7° attributed to (003) line of a hexagonal crystal and a peak around a diffraction angle of 20° attributed to (104)

line of a hexagonal crystal were found to be gradually shifted to a high angle side in the samples of a potential of 4.6 V or more, and a split was clearly observed in the samples of potentials of 4.7 V and 4.8 V, and only a peak on the high angle side was observed in the sample of a potential of 5.0 V. Further, two peaks observed around the diffraction angle of 26 to 27° attributed to (108) line and (110) line of a hexagonal crystal were gradually shifted to come close to each other in the sample of potential of 4.65 V or more, the peak on a low angle side began to disappear in the samples of potentials of 4.7 V and 4.8 V, and one peak was observed in the sample of potential of 5.0 V. From this, it is presumed that in the lithium transition metal composite oxide of Comparative Example 1-1, a crystal phase attributed to a cubic crystal appears in addition to a crystal phase attributed to a hexagonal crystal with the progress of electrochemical oxidation, and an oxidation reaction proceeds in a state of coexisting two phases and the crystal phase attributed to a hexagonal crystal is changed ultimately into the crystal phase attributed to a cubic crystal.

Figure 4A:
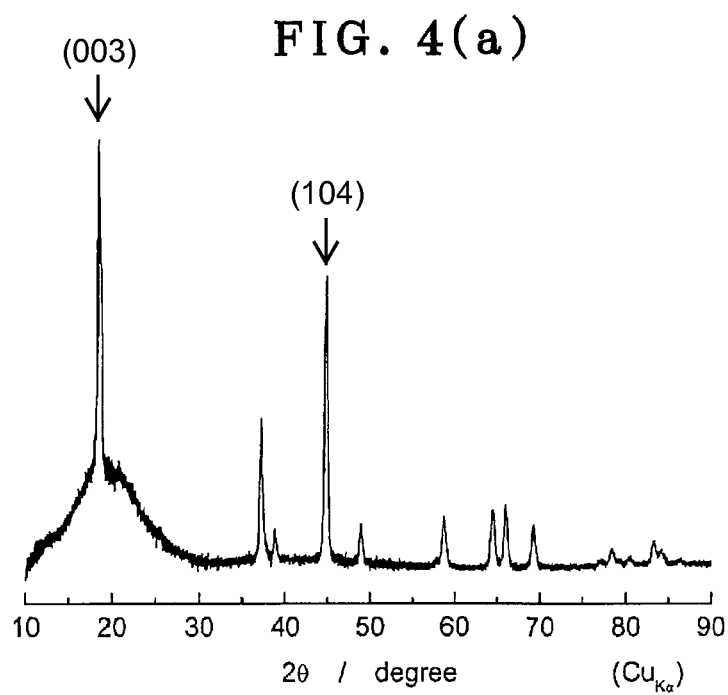
FIG. 4 is an X-ray diffraction chart at each electrochemical oxidation stage of a positive active material partial enlarged view Comparative Example 1-3 and its partial enlarged view.
Figure 4B:
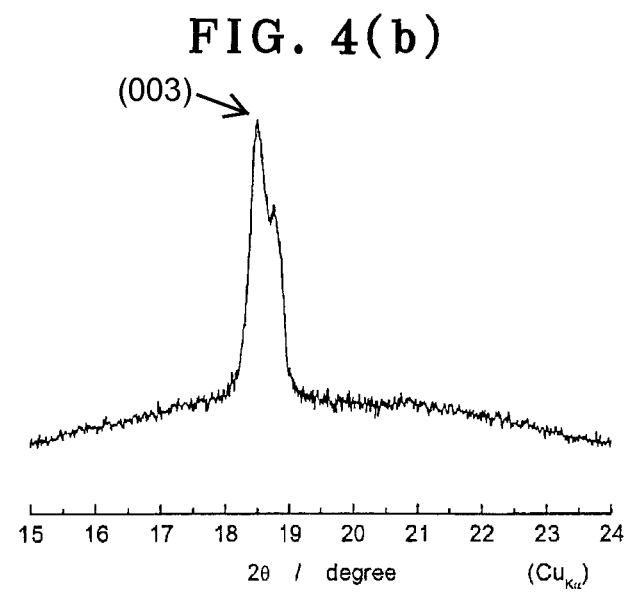

X-ray diffraction charts in the case of adopting a potential of 5 V of Comparative Examples 1-2 and 1-3 are shown in FIGS. 3(a) and 4(a). In both charts, since it can be visually observed that a peak around a diffraction angle of 18° attributed to (003) line of a hexagonal crystal splits, it is found that the crystal phase is not a single phase of a hexagonal crystal and in a state of coexistence with another phase in addition to the hexagonal crystal. Just to make sure, enlarged views of the peaks are shown in FIGS. 3(a) and 4(a).

It has been found from the above findings that the active material containing a lithium transition metal composite oxide, having a crystal structure of an α-NaFeO$_2$ type, represented by a compositional formula Li$_{1+\alpha}$Me$_{1-\alpha}$O$_2$ (Me is a transition metal element including Co, Ni and Mn, α>0) and having a molar ratio Li/Me of Li to the all transition metal elements Me of 1.2 to 1.6, is characterized by being observed as a single phase of a hexagonal crystal structure (a single phase attributed to a space group R3-m) on an X-ray diffraction chart when being electrochemically oxidized up to a potential of 5.0 V (vs. Li/Li$^+$), and thereby the active material enables the charge-discharge cycle performance of the nonaqueous electrolyte secondary battery using the active material to be excellent.

In addition, since a common X-ray diffraction measurement apparatus using a CuKα radiation is used in the measurement of FIG. 1, and a large-scale synchrotron radiation facility SPring-8 is used in the measurement of FIG. 2, a diffraction angle, of diffraction peak attributed to a hexagonal crystal (attributed to a space group R3-m) appears is largely different between both measurement, but there is no difference between both diffraction patterns and therefore similar analysis can be performed.

Examples 1-2 to 1-61, Comparative Examples 1-4 to 1-16

A lithium transition metal composite oxide was synthesized in the same manner as in Example 1-1 except for changing the mixing ratio between the coprecipitated carbonate precursor and lithium carbonate and the sintering temperature according to descriptions shown in Tables 2 and 3.

Further, but not shown in Tables 2 and 3, a pH of the content in the reaction tank was controlled so as to be maintained always at 10.0 (±0.05) in Example 1-25, always at 11.0 (±0.05) in Example 1-26, and always at 8.6 (±0.05) as with Example 1-1 in other Examples and Comparative Examples in the step of adding dropwise an aqueous sulfate solution and an aqueous solution containing sodium carbonate and ammonia to produce a coprecipitated carbonate precursor.

All lithium transition metal composite oxides thus obtained were subjected to X-ray diffraction measurement by an X-ray diffraction apparatus (manufactured by Rigaku Corporation, model number: MiniFlex II) using a CuKα radiation source, and consequently, an intensity ratio I$_{(003)}$/I$_{(114)}$ between the diffraction peak of (003) line and the diffraction peak of (114) line of all lithium transition metal composite oxides in Examples 1-1 to 1-61 and Comparative Examples 1-4 to 1-16 was 1.58 or more, as shown in Tables 2 and 3.

Further, the lithium transition metal composite oxides in Examples 1-2 to 1-61 were also confirmed to be observed as a single phase attributed to a space group R3-m (a single phase of a hexagonal crystal structure) on an X-ray diffraction chart when the lithium transition metal composite oxide was electrochemically oxidized up to a potential of 5.0 V (vs. Li/Li$^+$).

Each of the lithium transition metal composite oxides in Examples 1-2 to 1-61 and Comparative Examples 1-4 to 1-16 was used as a positive active material for a lithium secondary battery, and a lithium secondary battery was assembled by the following procedure. A paste for applying, in which N-methylpyrrolidone was used as a dispersion medium and the positive active material, acetylene black (AB) and polyvinylidene fluoride (PVdF) were kneaded/dispersed in a mass ratio of 90:5:5, was prepared. The paste for applying was applied to one surface of an aluminum foil current collector having a thickness of 20 μm to prepare a positive electrode plate. In addition, a mass of the active material applied per a certain area and an applied thickness were standardized so that the respective test conditions were the same among all lithium secondary batteries of Examples and Comparative Examples. In this way positive electrode plates of Examples 1-2 to 1-61 and Comparative Examples 1-4 to 1-16 were prepared.

Nonaqueous electrolyte secondary batteries were assembled in the same manner as in Example 1-1 except for using these positive electrode plates.

(Initial Efficiency Test)

The lithium secondary batteries prepared by the above procedure were subjected to an initial charge-discharge step at 25° C. The voltage control was all performed for a positive electrode potential. Charge was constant current-constant voltage charge with a current of 0.1 CmA and a voltage of 4.6 V, and the charge termination condition was set at a time point at which the current value decreased to ⅙. Discharge was carried out at constant current discharge under the conditions of a current of 0.1 CmA and a final voltage of 2.0 V. This charge-discharge was carried out by two cycles. Here, a rest process of 30 minutes was provided after charge and after discharge, respectively. A percentage represented by "(discharge electrical quantity)/(charge electrical quantity)×100" at the first cycle in the initial charge-discharge step was recorded as "initial efficiency (%)".

(Charge-Discharge Test)

Next, changing a charge voltage, a charge-discharge test of one cycle was performed. The voltage control was all performed for a positive electrode potential. The conditions of the charge-discharge test were the same as the conditions of the above initial charge-discharge step except for setting the charge voltage to 4.3 V (vs. Li/Li$^+$). The discharge electrical quantity at this time was recorded as "discharge capacity (mAh/g)" (denoted by "0.1 C capa" in Table).

(High Rate Discharge Test)

Subsequently, a charge voltage was set to 4.3 V (vs. Li/Li$^+$), charge was performed at a current of 0.1 CmA, and after rest of 30 minutes, discharge was performed at 2 CmA under the condition of a final voltage of 2.0 V. A percentage of the discharge capacity obtained at this time to the "discharge capacity (mAh/g)" obtained at the time of 0.1 CmA was denoted by "2 C/0.1 C".

(Measurement of Specific Surface Area)

An adsorbed amount [m$^2$] of nitrogen on the active material was determined by one point method using a specific surface area measurement apparatus manufactured by YUASA IONICS Co., Ltd. (trade name: MONOSORB). A value of the measured adsorbed amount [m$^2$] divided by an active material mass (g) was considered as a BET specific surface area. In measurement, gas adsorption through cooling using liquid nitrogen was carried out. Further, the sample was preheated at 120° C. for 15 minutes prior to the cooling. An amount of the measurement sample loaded was 0.5±0.01 g.

(Measurement of Tapped Density)

Using a tapping apparatus (made in 1968) manufactured by REI ELECTRIC CO., LTD., a value of an active material volume after counted tapping of 300 times divided by a mass of the active material was considered as a tapped density. In measurement, 2 g±0.2 g of the active material was loaded into a 10$^{-2}$ dm$^3$ measuring cylinder.

The results of the measurement test at the time when each of the lithium transition metal composite oxides of Examples 1-1 to 1-61 and Comparative Examples 1-4 to 1-16 was used as a positive active material for a lithium secondary battery, are shown in Tables 2 and 3.

TABLE 2

|  | Ratio Li/Me | Ratio Co/Me | Ratio Mn/Me | Sintering Temperature | BET (m$^2$/g) | tap (g/cm$^3$) | Before Charge-Discharge L$_{(003)}$/L$_{(114)}$ | Initial Efficiency (%) | 0.1 C capa (mAh/g) | 2 C/0.1 C (%) |
|---|---|---|---|---|---|---|---|---|---|---|
| Example 1-2 | 1.20 | 0.125 | 0.688 | 900° C. | 4.42 | 1.62 | 1.63 | 91.4% | 184.7 | 53.2% |
| Example 1-3 | 1.20 | 0.125 | 0.688 | 850° C. | 4.67 | 1.67 | 1.67 | 92.3% | 183.5 | 55.1% |
| Example 1-4 | 1.20 | 0.125 | 0.688 | 800° C. | 4.81 | 1.63 | 1.65 | 93.2% | 183.7 | 55.7% |
| Example 1-5 | 1.25 | 0.125 | 0.688 | 900° C. | 3.13 | 1.58 | 1.68 | 93.0% | 212.9 | 80.1% |
| Example 1-6 | 1.25 | 0.125 | 0.688 | 850° C. | 3.44 | 1.63 | 1.58 | 91.7% | 209.4 | 78.5% |
| Example 1-7 | 1.25 | 0.125 | 0.688 | 800° C. | 4.00 | 1.91 | 1.61 | 92.1% | 208.5 | 79.9% |
| Comparative Example 1-4 | 1.30 | 0.000 | 0.688 | 900° C. | 3.87 | 1.59 | 1.62 | 79.0% | 183.6 | 57.0% |
| Comparative Example 1-5 | 1.30 | 0.010 | 0.688 | 900° C. | 3.77 | 1.61 | 1.59 | 79.0% | 185.2 | 58.5% |
| Example 1-8 | 1.30 | 0.020 | 0.688 | 900° C. | 3.73 | 1.63 | 1.61 | 81.9% | 197.6 | 71.1% |
| Example 1-9 | 1.30 | 0.030 | 0.688 | 900° C. | 3.66 | 1.62 | 1.63 | 83.9% | 198.1 | 72.8% |
| Example 1-10 | 1.30 | 0.040 | 0.688 | 900° C. | 3.61 | 1.65 | 1.62 | 84.7% | 199.2 | 73.9% |
| Example 1-11 | 1.30 | 0.050 | 0.688 | 900° C. | 3.54 | 1.65 | 1.61 | 84.4% | 202.2 | 76.2% |
| Example 1-12 | 1.30 | 0.058 | 0.688 | 900° C. | 3.44 | 1.67 | 1.59 | 88.6% | 210.4 | 77.1% |
| Example 1-13 | 1.30 | 0.070 | 0.688 | 900° C. | 3.53 | 1.68 | 1.68 | 89.0% | 218.0 | 77.0% |
| Example 1-14 | 1.30 | 0.080 | 0.688 | 900° C. | 3.44 | 1.70 | 1.66 | 89.4% | 219.5 | 76.5% |
| Example 1-15 | 1.30 | 0.090 | 0.688 | 900° C. | 3.38 | 1.71 | 1.63 | 89.9% | 221.0 | 76.8% |
| Example 1-16 | 1.30 | 0.100 | 0.688 | 900° C. | 3.49 | 1.72 | 1.59 | 90.6% | 222.0 | 76.3% |
| Example 1-17 | 1.30 | 0.115 | 0.688 | 900° C. | 3.22 | 1.73 | 1.64 | 91.1% | 223.9 | 76.0% |
| Comparative Example 1-6 | 1.30 | 0.125 | 0.615 | 900° C. | 4.02 | 1.89 | 1.68 | 84.6% | 167.3 | 55.5% |
| Example 1-18 | 1.30 | 0.125 | 0.625 | 900° C. | 3.96 | 1.98 | 1.69 | 86.6% | 204.5 | 83.6% |
| Example 1-19 | 1.30 | 0.125 | 0.650 | 900° C. | 3.88 | 1.88 | 1.67 | 90.4% | 225.7 | 78.3% |
| Example 1-20 | 1.30 | 0.125 | 0.661 | 900° C. | 3.85 | 1.75 | 1.68 | 93.0% | 230.1 | 78.0% |
| Example 1-21 | 1.30 | 0.125 | 0.673 | 900° C. | 3.80 | 1.78 | 1.66 | 91.7% | 223.3 | 80.0% |
| Example 1-22 | 1.30 | 0.125 | 0.684 | 900° C. | 3.76 | 1.69 | 1.67 | 90.9% | 219.9 | 80.7% |
| Example 1-1 | 1.30 | 0.125 | 0.688 | 900° C. | 3.91 | 1.91 | 1.68 | 93.2% | 225.6 | 78.8% |
| Example 1-23 | 1.30 | 0.125 | 0.688 | 850° C. | 3.87 | 1.64 | 1.69 | 93.6% | 220.5 | 83.3% |
| Example 1-24 | 1.30 | 0.125 | 0.688 | 800° C. | 5.19 | 1.92 | 1.62 | 93.9% | 224.4 | 81.5% |
| Example 1-25 | 1.30 | 0.125 | 0.688 | 900° C. | 5.58 | 0.58 | 1.61 | 88.5% | 211.6 | 62.3% |
| Example 1-26 | 1.30 | 0.125 | 0.688 | 900° C. | 5.87 | 0.52 | 1.63 | 84.3% | 205.2 | 58.9% |
| Example 1-27 | 1.30 | 0.125 | 0.696 | 900° C. | 3.77 | 1.66 | 1.63 | 86.2% | 208.3 | 73.3% |
| Example 1-28 | 1.30 | 0.125 | 0.707 | 900° C. | 3.62 | 1.44 | 1.60 | 85.2% | 203.1 | 73.1% |
| Example 1-29 | 1.30 | 0.125 | 0.719 | 900° C. | 3.65 | 1.25 | 1.63 | 82.1% | 200.5 | 72.3% |
| Comparative Example 1-7 | 1.30 | 0.125 | 0.725 | 900° C. | 3.65 | 1.75 | 1.62 | 78.9% | 162.5 | 54.5% |
| Example 1-30 | 1.30 | 0.135 | 0.688 | 900° C. | 3.78 | 1.90 | 1.62 | 92.0% | 224.0 | 75.6% |
| Example 1-31 | 1.30 | 0.145 | 0.688 | 900° C. | 3.42 | 1.85 | 1.64 | 91.5% | 218.0 | 74.5% |
| Example 1-32 | 1.30 | 0.155 | 0.688 | 900° C. | 3.28 | 1.88 | 1.68 | 91.0% | 214.0 | 74.9% |
| Example 1-33 | 1.30 | 0.165 | 0.688 | 900° C. | 3.35 | 1.86 | 1.61 | 90.4% | 210.0 | 74.2% |
| Example 1-34 | 1.30 | 0.173 | 0.688 | 900° C. | 2.89 | 1.84 | 1.63 | 88.5% | 206.4 | 73.2% |
| Example 1-35 | 1.30 | 0.185 | 0.688 | 900° C. | 2.92 | 1.86 | 1.64 | 88.0% | 205.0 | 73.0% |
| Example 1-36 | 1.30 | 0.195 | 0.688 | 900° C. | 3.02 | 1.90 | 1.65 | 87.5% | 204.5 | 72.8% |
| Example 1-37 | 1.30 | 0.205 | 0.688 | 900° C. | 2.89 | 1.91 | 1.63 | 87.0% | 204.0 | 72.9% |
| Example 1-38 | 1.30 | 0.215 | 0.688 | 900° C. | 2.82 | 1.88 | 1.67 | 83.5% | 200.5 | 71.7% |
| Example 1-39 | 1.30 | 0.223 | 0.688 | 900° C. | 2.99 | 1.87 | 1.66 | 83.0% | 200.3 | 71.6% |
| Example 1-40 | 1.30 | 0.230 | 0.688 | 900° C. | 2.77 | 1.92 | 1.63 | 82.8% | 200.2 | 71.8% |
| Comparative Example 1-8 | 1.30 | 0.240 | 0.688 | 900° C. | 2.79 | 1.90 | 1.59 | 75.5% | 176.3 | 68.3% |

TABLE 3

|  | Ratio Li/Me | Ratio Co/Me | Ratio Mn/Me | Sintering Temperature | BET ($m^2$/g) | tap (g/$cm^3$) | Before Charge-Discharge $L_{(003)}/L_{(114)}$ | Initial Efficiency (%) | 0.1 C capa (mAh/g) | 2 C/0.1 C (%) |
|---|---|---|---|---|---|---|---|---|---|---|
| Comparative Example 1-9 | 1.30 | 0.250 | 0.688 | 900° C. | 2.83 | 1.88 | 1.63 | 69.7% | 147.9 | 62.4% |
| Comparative Example 1-10 | 1.30 | 0.260 | 0.688 | 900° C. | 2.85 | 1.90 | 1.64 | 65.8% | 123.4 | 58.3% |
| Comparative Example 1-11 | 1.30 | 0.270 | 0.688 | 900° C. | 2.91 | 1.91 | 1.62 | 62.3% | 119.7 | 50.7% |
| Comparative Example 1-12 | 1.30 | 0.280 | 0.688 | 900° C. | 2.82 | 1.91 | 1.62 | 58.4% | 111.3 | 42.3% |
| Comparative Example 1-13 | 1.30 | 0.288 | 0.688 | 900° C. | 2.89 | 1.91 | 1.63 | 55.7% | 105.4 | 36.2% |
| Comparative Example 1-14 | 1.35 | 0.125 | 0.615 | 900° C. | 3.76 | 1.90 | 1.62 | 82.4% | 166.5 | 56.5% |
| Example 1-41 | 1.35 | 0.125 | 0.650 | 900° C. | 3.75 | 1.87 | 1.63 | 83.5% | 213.2 | 77.7% |
| Example 1-42 | 1.35 | 0.125 | 0.661 | 900° C. | 3.71 | 1.85 | 1.61 | 87.2% | 228.0 | 77.3% |
| Example 1-43 | 1.35 | 0.125 | 0.673 | 900° C. | 3.68 | 1.81 | 1.64 | 89.2% | 226.6 | 79.2% |
| Example 1-44 | 1.35 | 0.125 | 0.684 | 900° C. | 3.65 | 1.76 | 1.66 | 88.0% | 223.0 | 75.4% |
| Example 1-45 | 1.35 | 0.125 | 0.688 | 900° C. | 2.98 | 1.88 | 1.62 | 91.3% | 231.6 | 79.5% |
| Example 1-46 | 1.35 | 0.125 | 0.688 | 850° C. | 3.79 | 1.91 | 1.65 | 90.2% | 215.8 | 81.6% |
| Example 1-47 | 1.35 | 0.125 | 0.688 | 800° C. | 3.71 | 1.66 | 1.64 | 90.4% | 221.4 | 76.4% |
| Example 1-48 | 1.35 | 0.125 | 0.696 | 900° C. | 3.62 | 1.64 | 1.66 | 86.6% | 213.5 | 77.7% |
| Example 1-49 | 1.35 | 0.125 | 0.707 | 900° C. | 3.59 | 1.55 | 1.68 | 86.8% | 208.5 | 78.3% |
| Example 1-50 | 1.35 | 0.125 | 0.719 | 900° C. | 3.54 | 1.39 | 1.64 | 82.0% | 204.5 | 74.3% |
| Comparative Example 1-15 | 1.35 | 0.125 | 0.725 | 900° C. | 3.54 | 1.78 | 1.63 | 77.9% | 162.5 | 52.7% |
| Example 1-51 | 1.40 | 0.125 | 0.688 | 1000° C. | 0.51 | 1.86 | 1.68 | 72.2% | 199.8 | 33.7% |
| Example 1-52 | 1.40 | 0.125 | 0.688 | 980° C. | 0.64 | 1.88 | 1.68 | 75.1% | 201.4 | 42.5% |
| Example 1-53 | 1.40 | 0.125 | 0.688 | 960° C. | 0.75 | 1.87 | 1.88 | 77.1% | 203.2 | 54.2% |
| Example 1-54 | 1.40 | 0.125 | 0.688 | 940° C. | 0.88 | 1.85 | 1.68 | 80.5% | 216.0 | 60.8% |
| Example 1-55 | 1.40 | 0.125 | 0.688 | 920° C. | 1.05 | 1.87 | 1.68 | 81.8% | 217.8 | 69.2% |
| Example 1-56 | 1.40 | 0.125 | 0.688 | 900° C. | 1.24 | 1.88 | 1.69 | 82.5% | 223.0 | 76.8% |
| Example 1-57 | 1.40 | 0.125 | 0.688 | 850° C. | 2.25 | 1.67 | 1.67 | 83.3% | 212.9 | 80.1% |
| Example 1-58 | 1.40 | 0.125 | 0.688 | 800° C. | 3.43 | 1.89 | 1.68 | 82.8% | 206.9 | 76.0% |
| Example 1-59 | 1.45 | 0.125 | 0.688 | 900° C. | 0.86 | 1.88 | 1.66 | 77.3% | 188.2 | 65.3% |
| Example 1-60 | 1.50 | 0.125 | 0.688 | 1000° C. | 0.51 | 1.61 | 1.69 | 75.2% | 223.6 | 52.0% |
| Example 1-61 | 1.60 | 0.125 | 0.688 | 1000° C. | 0.32 | 1.42 | 1.81 | 69.0% | 204.2 | 51.0% |
| Comparative Example 1-16 | 1.80 | 0.125 | 0.688 | 1000° C. | 0.67 | 1.81 | 1.83 | 56.6% | 116.9 | 52.4% |

From Tables 2 to 3, it is found that a high discharge capacity can be obtained when the lithium transition metal composite oxide, in which the ratio Li/Me is 1.2 to 1.6, the ratio Co/Me is 0.02 to 0.23, and the ratio Co/Me is 0.62 to 0.72, is used as a positive active material for a lithium secondary battery. It is found that among these, when the ratio Li/Me is 1.25 to 1.40, a lithium secondary battery having a high discharge capacity and excellent initial efficiency can be obtained, and when the ratio Li/Me is 1.250 to 1.350, the ratio Co/Me is 0.040 to 0.195, and the ratio Mn/Me is 0.625 to 0.707, the initial efficiency is further improved, and high rate discharge performance is also improved. It can be said that a BET specific surface area is preferably 0.88 $m^2$/g or more in order to improve the initial efficiency and the high rate discharge performance further, and a tapped density is preferably 1.25 g/$cm^3$ or more in order to improve the high rate discharge performance further.

Example 2

Example 2-1

4.6959 g of cobalt sulfate heptahydrate, 7.0043 g of nickel sulfate hexahydrate and 21.766 g of manganese sulfate pentahydrate were weighed, and dissolved in 200 ml of ion-exchanged water to prepare a 0.67 M aqueous sulfate solution of which the molar ratio of Co:Ni:Mn was 12.5:18.75:68.75. On the other hand, 750 ml of ion-exchanged water was poured into a 2 $dm^3$ reaction tank, and $CO_2$ was dissolved in the ion-exchanged water by bubbling $CO_2$ gas for 30 minutes in the ion-exchanged water. A temperature of the reaction tank was set to 50° C. (±2° C.), and the aqueous sulfate solution was added dropwise at a rate of 3 ml/min while stirring the content in the reaction tank at a rotational speed of 700 rpm using a paddle blade equipped with a stirring motor. Here, from the start of the dropwise addition until the completion thereof, an aqueous solution containing 0.67 M of sodium carbonate and 0.067 M of ammonia was appropriately added dropwise to control the content in the reaction tank so as to always maintain a pH of 8.6 (±0.05). After the completion of the dropwise addition, the stirring was continued for further one hour. After the stirring was stopped, the solution was left standing for 12 hours or more.

Next, using a suction filtration apparatus, particles of coprecipitated carbonate salt produced in the reaction tank were separated, and sodium ions adhering to the particles were cleaned and removed with ion-exchange water, and the resulting particles were dried at 100° C. under ordinary pressure in an air atmosphere by using an electric furnace. Thereafter, particles were pulverized for several minutes by using an automatic mortar made of agate in order to level particle sizes. In this way, a coprecipitated carbonate precursor was prepared.

Lithium carbonate (0.9699 g) was added to 2.2780 g of the coprecipitated carbonate precursor, and the resulting mixture was adequately mixed by using an automatic mortar made of agate to prepare a mixed powder in which the molar ratio of Li and (Co, Ni, Mn) was 130:100. The mixed powder was molded at a pressure of 6 MPa by using a pellet molding machine to be formed into pellets with a diameter of 25 mm. The amount of the mixed powder subjected to pellet molding was determined so as to be equivalent to 2 g of a mass of an assumed final product. One of the pellets was placed on an aluminum boat having an entire length of about 100 mm, placed together with the boat in a box type electric furnace (model number: AMF 20), and sintered at 900° C. for 10 hours under ordinary pressure in an air atmosphere. Inner dimensions of the box type electric furnace were 10 cm long, 20 cm wide and 30 cm deep, and heating wires were disposed in a width direction at 20-centimeter intervals. After sintering, a heater was turned off, and the aluminum boat was naturally cooled as it was left standing in the furnace. Consequently, a temperature of the furnace was lowered to about 200° C. after 5 hours, but a subsequent temperature lowering rate was slightly mild. After a lapse of a whole day and night, it was confirmed that a temperature of the furnace was 100° C. or lower, and then the pellet was taken out and pulverized for several minutes by using an automatic mortar made of agate in order to level particle sizes. In this way, a lithium transition metal composite oxide of Example 2-1 was prepared.

As a result of composition analysis, the obtained lithium transition metal composite oxide had the composition of $Li_{1.13}Co_{0.11}Ni_{0.17}Mn_{0.59}O_2$. Further, as a result of powder X-ray diffraction measurement using a $CuK_\alpha$ radiation, the lithium transition metal composite oxide was observed to have a single phase of a hexagonal crystal structure of an $\alpha$-$NaFeO_2$ type.

Example 2-2

A lithium transition metal composite oxide of Example 2-2 was prepared by the same procedure as in Example 2-1 except for using, as a mixed powder to be subjected to pellet-molding, a mixed powder, in which the molar ratio of Li and (Co, Ni, Mn) was 140:100, prepared by adding 1.0216 g of lithium carbonate to 2.2278 g of the coprecipitated carbonate precursor prepared in Example 2-1, and adequately mixing the resulting mixture by using an automatic mortar made of agate.

As a result of composition analysis, the obtained lithium transition metal composite oxide had the composition of $Li_{1.17}Co_{0.10}Ni_{0.17}Mn_{0.56}O_2$. Further, as a result of powder X-ray diffraction measurement using a $CuK_\alpha$ radiation, the lithium transition metal composite oxide was observed to have a single phase of a hexagonal crystal structure of an $\alpha$-$NaFeO_2$ type.

Comparative Example 2-1

A reaction tank used in the present comparative example was cylindrical, and was provided with an overflow pipe for always ejecting a slurry of a reaction crystallization product out of a system at a certain flow rate in the upper part, and had a volume of 5 L. Pure water (4 L) was put in the reaction tank. Further, a 32% aqueous sodium hydroxide solution was added so as to have a pH of 11.6. The aqueous sodium hydroxide solution was stirred at a rotational speed of 1350 rpm using a stirrer equipped with a stirring blade of a paddle type, and a solution temperature in the reaction tank was maintained at 50° C. by a heater.

An aqueous solution of nickel sulfate ($NiSO_4$) having a concentration of 1.0 mold, an aqueous solution of manganese sulfate ($MnSO_4$) having a concentration of 1.0 mol/l, an aqueous solution of cobalt sulfate ($CoSO_4$) having a concentration of 1.0 mold, an aqueous ammonium sulfate (($NH_4$)$_2SO_4$) solution having a concentration of 6 mol/l, and a 4 wt % aqueous hydrazine ($NH_2NH_2$) solution were respectively mixed in a volume ratio of 0.33:0.33:0.33:0.05: 0.01 to prepare an aqueous sulfate solution in which the molar ratio of Co, Ni, and Mn was 1:1:1.

The aqueous sulfate solution was continuously added dropwise to the reaction tank at a flow rate of 13 mL/min. A 32% aqueous sodium hydroxide solution was intermittently loaded into the reaction tank so as to have a constant pH of 11.3. A solution temperature in the reaction tank was intermittently controlled by a heater so as to be constant at 50° C.

A slurry of a Ni—Mn—Co composite oxide as a reaction crystallization product was continuously collected from the overflow pipe for 24 hours after a elapse of 50 hours from the start of loading a raw material solution. The collected slurry was washed with water and filtrated. The filtrated substance was dried at 100° C. for 20 hours to obtain a dried powder of a coprecipitated hydroxide precursor.

The obtained coprecipitated hydroxide precursor and a lithium hydroxide monohydrate salt powder were weighed so as to have the molar ratio of Li and (Co, Ni, Mn) of 102:100, and these compounds were adequately mixed. The mixture was filled in an aluminum sagger, and a temperature of the mixture was raised to 1000° C. at a temperature raising rate of 100° C./h, maintained at 1000° C. for 15 hours and cooled to 600° C. at a temperature lowering rate of 100° C./h using the electric furnace under a dry air stream, and then the mixture was left standing to be cooled. In this way, a lithium transition metal composite oxide of Comparative Example 2-1 was obtained.

As a result of composition analysis, the obtained lithium transition metal composite oxide had the composition of $Li_{1.0}Co_{0.33}Ni_{0.33}Mn_{0.33}O_2$. Further, as a result of powder X-ray diffraction measurement using a $CuK_\alpha$ radiation source, the lithium transition metal composite oxide was observed to have a single phase of a hexagonal crystal structure of an $\alpha$-$NaFeO_2$ type.

Comparative Example 2-2

An aqueous sulfate solution, in which the respective elements Co, Ni, and Mn were dissolved in the molar ratio of 12.5:18.75:68.75, was prepared. On the other hand, a temperature of a reaction tank poured with ion-exchange water was maintained at 50° C., and an aqueous NaOH solution was added dropwise thereto to adjust a pH to 11.5. Next, dissolved oxygen was removed by bubbling an inert gas. The aqueous sulfate solution was added dropwise at a feed rate of 3 ml/min while stirring the content in the reaction tank. Simultaneously, an aqueous hydrazine solution as a reducing agent was added dropwise at a feed rate of 0.83 ml/min. While the dropwise addition was continued, the temperature of the reaction tank was maintained at 50° C., and an aqueous NaOH solution was appropriately added dropwise while monitoring a pH so that the pH always falls within the range of 11.5±0.05. After the completion of the dropwise addition, the stirring was stopped and the solution was left standing for 12 hours or more. Next, the resulting coprecipitated product was separated by filtration and dried at 100° C. under ordinary pressure in an air atmosphere by using an oven. After drying, the coprecipitated product was pulverized lightly to an extent of leveling particle sizes. Thereby, a dried powder was obtained.

Lithium hydroxide was added to the obtained dried powder so as to have the molar ratio of Li and (Co+Ni+Mn) of 150:100, and the resulting mixture was dry-mixed to prepare a mixed powder. Next, 5 kg of the mixed powder was placed in an electric furnace and sintered under ordinary pressure in an air atmosphere at 1000° C. over 12 hours. After sintering, a heater was turned off, and the powder was naturally cooled as it was left standing in the furnace. After a elapse of a whole day and night, it was confirmed that a temperature of the furnace was 100° C. or lower, and then the powder was taken out and pulverized lightly to an extent of leveling particle sizes. In this way, a lithium transition metal composite oxide of Comparative Example 2-2 was obtained.

As a result of composition analysis, the obtained lithium transition metal composite oxide had the composition of $Li_{1.2}Co_{0.1}Ni_{0.15}Mn_{0.55}O_2$. Further, as a result of powder X-ray diffraction measurement using a $CuK_\alpha$ radiation source, the lithium transition metal composite oxide was observed to have a single phase of a hexagonal crystal structure of an $\alpha$-$NaFeO_2$ type.

Comparative Example 2-3

A lithium transition metal composite oxide of Comparative Example 2-3 was prepared by the same procedure as in Example 2-1 except for performing sinter at 1000° C. for 10 hours as a sintering condition.

As a result of composition analysis, the obtained lithium transition metal composite oxide had the composition of $Li_{1.13}Co_{0.11}Ni_{0.17}Mn_{0.59}O_2$. Further, as a result of powder X-ray diffraction measurement using a $CuK_\alpha$ radiation, the lithium transition metal composite oxide was observed to have a single phase of a hexagonal crystal structure of an $\alpha$-$NaFeO_2$ type.

Comparative Example 2-4

A coprecipitated hydroxide precursor was prepared by the same procedure as in Comparative Example 1 except for using an aqueous sulfate solution in which the molar ratio of Co, Ni, and Mn was 12.5:19.94:67.56. Next, in a sintering step, a lithium transition metal composite oxide of Comparative Example 2-4 was prepared by employing the same procedure as in Example 2-1 except for preparing a mixed powder in which the molar ratio of Li and (Co,Ni,Mn) was 130:100 by using the obtained coprecipitated hydroxide salt precursor and a lithium hydroxide monohydrate salt powder.

As a result of composition analysis, the obtained lithium transition metal composite oxide had the composition of $Li_{1.13}Co_{0.11}Ni_{0.17}Mn_{0.59}O_2$. Further, as a result of powder X-ray diffraction measurement using a $CuK_\alpha$ radiation, the lithium transition metal composite oxide was observed to have a single phase of a hexagonal crystal structure of an $\alpha$-$NaFeO_2$ type.

Comparative Example 2-5

Lithium carbonate ($Li_2CO_3$), cobalt hydroxide (Co$(OH)_2$), nickel hydroxide ($Ni(OH)_2$) and manganese oxyhydroxide (MnOOH) were weighed so as to have the ratio of 130:12.50:19.94:67.56 of the respective elements Li, Co, Ni, and Mn, and these raw materials were adequately mixed and pulverized using a mortar to obtain a raw material mixture. Next, 3 g of a raw material mixture was take out from the raw material mixture, and sintered at 900° C. for 10 hours in the air. In this way, a lithium transition metal composite oxide of Comparative Example 2-5 was obtained.

As a result of composition analysis, the obtained lithium transition metal composite oxide had the composition of $Li_{1.13}Co_{0.11}Ni_{0.17}Mn_{0.59}O_2$. Further, as a result of powder X-ray diffraction measurement using a $CuK_\alpha$ radiation, the lithium transition metal composite oxide was observed to have a single phase of a hexagonal crystal structure of an $\alpha$-$NaFeO_2$ type.

(Assembling and Evaluation of Nonaqueous Electrolyte Secondary Battery)

Each of the lithium transition metal composite oxides in Examples 2-1, 2-2 and Comparative Examples 2-1 to 2-5 was used as a positive active material for a nonaqueous electrolyte secondary battery, and a nonaqueous electrolyte secondary battery was assembled by the following procedure, and battery characteristics thereof were evaluated.

A positive active material, acetylene black (AB) and polyvinylidene fluoride (PVdF) were respectively mixed in a mass ratio of 85:8:7. To this, N-methylpyrrolidone as a dispersion medium was added, and the resulting mixture was kneaded/dispersed to prepare a applying paste. In addition, a mass ratio of the PVdF was shown on a solid mass basis since a liquid in which a solid content was dissolved/dispersed was used. The applying paste was applied onto an aluminum foil current collector having a thickness of 20 μm to prepare a positive electrode plate.

A lithium metal was used for a counter electrode (negative electrode) in order to observe the behavior of the positive electrode alone. The lithium metal was closely attached to a nickel foil current collector. However, it was prepared in such a manner that the capacity of the nonaqueous electrolyte secondary battery was controlled adequately by the positive electrode.

As an electrolyte solution, a solution obtained by dissolving $LiPF_6$, so as to have a concentration of 1 mol/l, in a mixed solvent in which a volume ratio of EC/EMC/DMC was 6:7:7 was used. A microporous membrane made of polypropylene, in which an electrolyte retainbility was improved by surface modification using polyacrylate, was used as a separator. A nickel plate, to which a lithium metal foil was attached, was used as a reference electrode. A metal-resin composite film made of polyethylene terephthalate (15 μm)/aluminum foil (50 μm)/metal-adhesive polypropylene film (50 μm) was used for a outer case. The respective electrodes were housed in the outer case in such a way that open ends of a positive electrode terminal, a negative electrode terminal and a reference electrode terminal were exposed to outside. And fusion margins with the inner surfaces of the aforementioned metal resin composite films facing each other were airtightly sealed except a portion forming an electrolyte solution filling hole.

On the nonaqueous electrolyte secondary batteries thus assembled, an initial charge-discharge step of two cycles was performed at 25° C. The voltage control was all performed for a positive electrode potential. Charge was constant current-constant voltage charge with a current of 0.1 CmA and a voltage of 4.6 V. The charge termination condition was set at a time point at which the current value decreased to 0.02 CmA. Discharge was carried out at constant current discharge under the conditions of a current of 0.1 CmA and a final voltage of 2.0 V. In all cycles, a rest time of 30 minutes was set after charge and after discharge. Nonaqueous electrolyte secondary batteries of Examples and Comparative Examples were completed in this way.

On the completed nonaqueous electrolyte secondary batteries, charge-discharge of three cycles was performed. The voltage control was all performed for a positive electrode potential. The conditions of the charge-discharge cycle test were the same as the conditions of the above initial charge-discharge step except for setting the charge voltage to 4.3 V (vs. Li/Li+). In all cycles, a rest time of 30 minutes was set after charge and after discharge.

Next, a high rate discharge test was carried out by the following procedure. First, constant current and constant voltage charge in which a current was 0.1 CmA and a voltage was 4.3 V was carried out. After rest of 30 minutes, constant current discharge under the conditions of a current of 1 CmA and a final voltage of 2.0 V was performed, and a discharge capacity at this time was recorded as "high rate discharge capacity (mAh/g)".

(Measurement of Oxygen Position Parameter)

The battery after subjecting to the high rate discharge test was further subjected to additional discharge under the condition of constant current discharge under the conditions of a current of 0.1 CmA and a final voltage of 2.0 V, and then the positive electrode plate was taken out of the battery outlet case in a dry room. The positive electrode plate taken out was subjected to X-ray diffraction measurement with a positive composite layer to the current collector without being washed and the like. Crystal structure analysis by a Rietveld method was performed on all diffracted lines excluding peaks resulting from aluminum used as a metal foil current collector. As a software used for Rietveld analysis, RIETAN 2000 (Izumi et al., Mater. Sci. Forum, 321-324, p. 198 (2000)) was used. As a profile function used for analysis, a pseudo-Voigt function of TCH was used. A peak position shift parameter was previously refined by using a silicon standard sample (Nist 640c) having a known lattice constant. A crystal structure model of the positive active material is set to a space group R3-m, and the following parameters were refined at each atom position.
  background parameter
  lattice constant
  oxygen position parameter z
  half width parameter of Gauss function
  half width parameter of Lorentz function
  asymmetry parameter
  preferred-orientation parameter
  isotropic atomic displacement parameter (however, fixed to 0.75 for Li atom)

Diffraction data between 15° and 85° (CuKα) was used as actual data, and this was refined to such an extent that an value of S indicating the degree of difference from the crystal model structure was reduced below 1.3.

Aside from the batteries subjected to the above-mentioned tests, each of the lithium transition metal composite oxides in Examples 2-1, 2-2 and Comparative Examples 2-1 to 2-5 was used as a positive active material for a nonaqueous electrolyte secondary battery, and each nonaqueous electrolyte secondary battery was assembled by the above procedure, and initial charge was performed. The voltage control was all performed for a positive electrode potential. The condition of the initial charge was set to the constant voltage and constant current charge under the conditions of a voltage of 5.0 V and a current of 0.1 CmA, and the condition of ending the charge was set to be the time point when the electric current value was decreased to 0.02 CmA.

These batteries were disassembled in a dry room, and the positive electrode plates were taken out. Each of the positive electrode plates taken out was stuck to a sample holder for measurement as-is without being washed and the like, and subjected to X-ray diffraction measurement by an X-ray diffraction apparatus (manufactured by Rigaku Corporation, model number: MiniFlex II) using a CuKα radiation source. The results of measurement are shown in FIG. 5.

Figure 5:
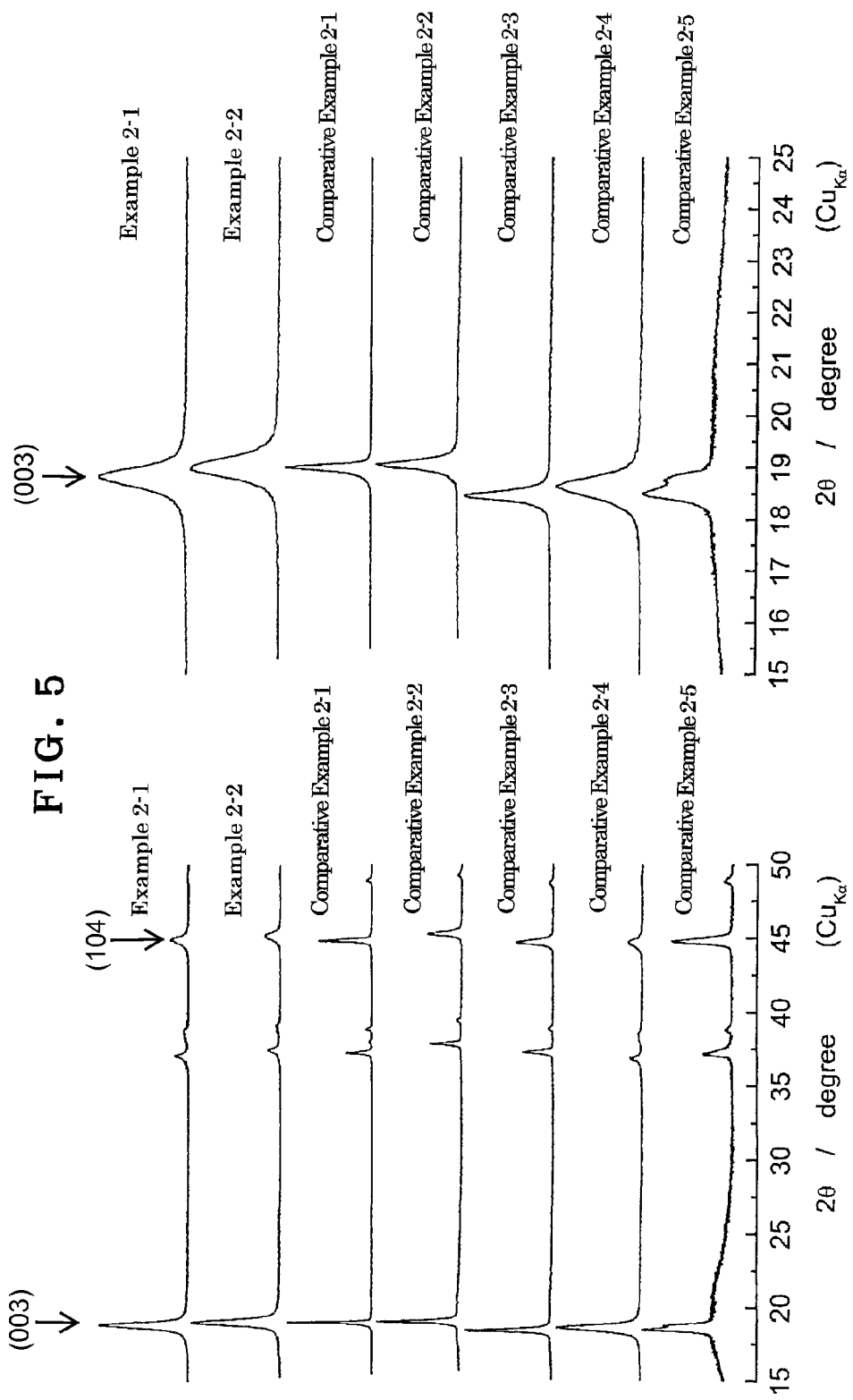
FIG. 5 is an X-ray diffraction chart in electrochemically oxidizing the positive active materials of Examples 2-1, 2-2 and Comparative Examples 2-1 to 2-5 to a potential of 5.0 V (vs. Li/Li$^+$).

A series of charts on a left side of FIG. 5 are diffraction charts drawn within a diffraction angle range from 15° to 50°, and a series of charts on a right side are diffraction charts redrawn by setting a diffraction angle range to from 15° to 25° in order to observe a diffraction peak around 19° in detail. From these diffraction charts, it is found that each of the lithium transition metal composite oxides has a single phase attributed to a space group R3-m in Examples 2-1, 2-2 and Comparative Examples 2-1 to 2-4. On the other hand, in Comparative Example 2-5, it is found that as is characterized in that the diffraction peak around 19° is split, a crystal structure belongs to R3-m, but it has a multiphase.

The results of the measurement of a high rate discharge capacity, the results of the measurement of a oxygen position parameter, and the results of the measurement of X-ray diffraction after electrochemically oxidizing up to a potential of 5.0 V (vs. Li/Li+) are shown in Table 4.

TABLE 4

|  | Composition | Ratio Li/Me | Phase (oxidized up to 5.0 V) | Oxygen Position Parameter (Discharge End) | High Rate Discharge Capacity (mAh/g) |
|---|---|---|---|---|---|
| Example 2-1 | $Li_{1.13}Co_{0.11}Ni_{0.17}Mn_{0.59}O_2$ | 1.3 | Single Phase | 0.259 | 180 |
| Example 2-2 | $Li_{1.17}Co_{0.10}Ni_{0.17}Mn_{0.56}O_2$ | 1.4 | Single Phase | 0.260 | 182 |
| Comparative Example 2-1 | $LiCo_{0.33}Ni_{0.33}Mn_{0.33}O_2$ | 1.0 | Single Phase | 0.263 | 142 |
| Comparative Example 2-2 | $Li_{1.20}Co_{0.10}Ni_{0.15}Mn_{0.55}O_2$ | 1.5 | Single Phase | 0.263 | 155 |
| Comparative Example 2-3 | $Li_{1.13}Co_{0.11}Ni_{0.17}Mn_{0.59}O_2$ | 1.3 | Single Phase | 0.264 | 149 |
| Comparative Example 2-4 | $Li_{1.13}Co_{0.11}Ni_{0.17}Mn_{0.59}O_2$ | 1.3 | Single Phase | 0.265 | 148 |
| Comparative Example 2-5 | $Li_{1.13}Co_{0.11}Ni_{0.17}Mn_{0.59}O_2$ | 1.3 | Multiphase | 0.260 | 135 |

It has been found from the above knowledge that the active material for a nonaqueous electrolyte secondary battery containing a lithium transition metal composite oxide, having a crystal structure of an α-NaFeO$_2$ type, represented by a compositional formula $Li_{1+\alpha}Me_{1-\alpha}O_2$ (Me is a transition metal element including Co, Ni and Mn, α>0) and having a compositional ratio (1+α)/(1−α) of Li to the transition metal element Me of 1.2 to 1.6, is observed as a single phase attributed to a space group R3-m on an X-ray diffraction chart when the lithium transition metal composite oxide is electrochemically oxidized up to a potential of 5.0 V (vs. Li/Li+) and is characterized in that an oxygen position parameter determined by crystal structure analysis by a Rietveld method based on an X-ray diffraction pattern is 0.260 or less, and thereby the active material enables the high rate discharge performance of the nonaqueous electrolyte secondary battery using the active material to be excellent.

The reason why, with respect to lithium transition metal composite oxide observed as a single phase attributed to a space group R3-m on an X-ray diffraction chart when the lithium transition metal composite oxide is electrochemically oxidized up to a potential of 5.0 V (vs. Li/Li$^+$), the lithium transition metal composite oxide having an oxygen position parameter of 0.260 or less is more superior in the high rate discharge performance than the lithium transition metal composite oxide having an oxygen position parameter exceeding 0.260, is not necessarily clear. However, the present inventor presumes that since having a smaller value of the oxygen position parameter means that an O (oxygen) position is more apart from a Li (lithium) position, this may be linked with the fact that Li hardly undergoes an interaction with an oxygen atom in electrochemically intercalation/deintercalation of Li.

Example 3

Synthesis of Active Material

A 2 M aqueous sulfate solution was prepared by weighing cobalt sulfate heptahydrate, nickel sulfate hexahydrate and manganese sulfate pentahydrate so as to have the molar ratio of 12.5:19.94:67.56 of Co, Ni, and Mn, and dissolving these compound in ion-exchanged water. On the other hand, a 15 L reaction tank was prepared. An outlet was fixed in this reaction tank so that a solution was ejected from the outlet if a liquid level in the reaction tank exceeded a certain height. Further, a stirring blade was fixed in the reaction tank, and a cylindrical convection plate was fixed in the reaction tank in order to cause convection in a vertical direction during stirring the solution. Ion-exchanged water (7 L) was poured into the reaction tank, and a $CO_2$ gas was adequately dissolved in the ion-exchanged water by bubbling the $CO_2$ gas for 30 minutes in the ion-exchanged water. In addition, the $CO_2$ gas bubbling was continued until the dropwise addition of the aqueous sulfate solution was completed. Next, a temperature of the reaction tank was set to 50° C., and the mixing blade was operated at a rotational speed of 1000 rpm. The aqueous sulfate solution (2 L) was added dropwise gradually to the content in the reaction tank. The stirring was continued during the dropwise addition. Further, an aqueous solution containing 2 M of sodium carbonate and 0.2 M of ammonia dissolved was appropriately added while always monitoring a pH in the reaction tank so as to maintain the pH within the range of 8.6±0.2. A part of a solution containing a reaction product was ejected out of the reaction tank from the liquid outlet during the aqueous sulfate solution was added dropwise, but the ejected solution was discarded without being returned to the reaction tank before the dropwise addition of all of 2 L of the aqueous sulfate solution was completed. After the completion of dropwise addition, a coprecipitated product was separated from a solution containing a reaction product by suction filtration, and the coprecipitated product was washed with ion-exchange water in order to remove sodium ions attaching to the coprecipitated product. Next, the coprecipitated product was dried at 100° C. under ordinary pressure in an air atmosphere by using an oven. After drying, the coprecipitated product was pulverized for several minutes by using a mortar in order to level particle sizes. In this way, a powder of a coprecipitated carbonate precursor was prepared.

Lithium carbonate was added to the above coprecipitated carbonate precursor to prepare a mixed powder in which the molar ratio of Li and Me (Co, Ni, Mn) was 130:100. Here, the amount of lithium carbonate was adjusted so that the amount of Li was 3% excessive relative to a stoichiometric proportion. The mixed powder was transferred to a sagger, and placed in a furnace. A temperature of the furnace was raised from room temperature to 900° C. over 4 hours, and the mixed powder was sintered at 900° C. for 10 hours under ordinary pressure. After a temperature of the furnace was returned to ordinary temperature, a sintered product was taken out and pulverized to an extent of leveling particle sizes by using a mortar. In this way, Li[Li$_{0.13}$Co$_{0.109}$Ni$_{0.173}$Mn$_{0.588}$]O$_2$ (ratio Li/Me: 1.30) was prepared.

(Assembling of Prismatic Lithium Secondary Battery)

Figure 7:
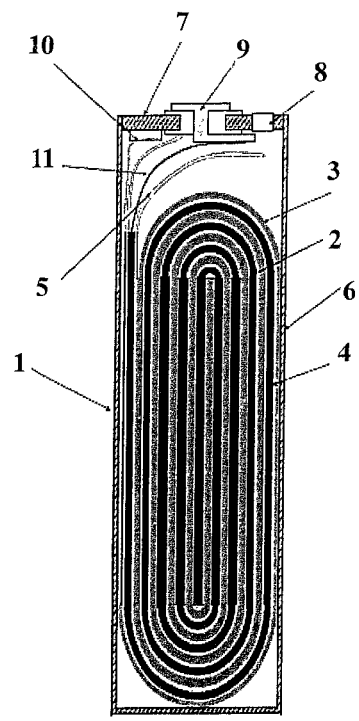
FIG. 7 is a view showing an embodiment of the present invention, which is a longitudinal sectional view of a prismatic lithium secondary battery.

FIG. 7 is a schematic sectional view of a prismatic lithium secondary battery used in the present example. The prismatic lithium secondary battery 1 is formed by housing a electric power generating element including a flat rolled electrode group 2 formed by winding a positive electrode plate 3 in which a aluminum foil current collector is provided with a positive composite layer containing a positive active material, and a negative electrode plate 4 in which a copper foil current collector is provided with a negative composite layer containing a negative active material with a separator 5 sandwiched between the electrode plates, and a nonaqueous electrolyte containing electrolyte salt in a battery case 6 of 34 mm wide, 50 mm high and 5.2 mm thick.

A battery lid 7 provided with a safety valve 8 is attached to the battery case 6 by laser welding, the negative electrode plate 4 is connected a negative electrode terminal 9 through a negative electrode lead 11, and the positive electrode plate 3 is connected the battery lid through a positive electrode lead 10.

(Positive Electrode Plate)

The Li[Li$_{0.13}$Co$_{0.109}$Ni$_{0.173}$Mn$_{0.588}$]O$_2$ prepared in the above way was used as a positive active material, and a prismatic lithium secondary battery was prepared by the following procedure.

A positive paste, in which N-methylpyrrolidone was used as a dispersion medium, and the positive active material, acetylene black (AB) and polyvinylidene fluoride (PVdF) were kneaded/dispersed in a mass ratio of 90:5:5, was prepared. The positive paste was applied onto both surfaces of an aluminum foil current collector having a thickness of 15 μm and dried. Next, a positive electrode plate was prepared by roller pressing so that a packed density of a composite is 2.6 g/cm$^3$.

(Negative Electrode Plate)

On the other hand, a negative paste, in which ion-exchange water was used as a dispersion medium and graphite as a negative active material, and carboxymethyl cellulose (CMC) and styrene-butadiene rubber (SBR) were kneaded/dispersed in a mass ratio of 97:2:1, was prepared. The negative paste was applied onto both surfaces of a copper foil current collector having a thickness of 10 μm and dried. Next, a negative electrode plate was prepared by roller pressing so that a packed density of a composite was 1.4 g/cm$^3$.

(Electrolyte Solution)

As an electrolyte solution, a solution obtained by dissolving LiPF$_6$ so as to have a concentration of 1 mol/l in a mixed solvent in which ethylene carbonate (EC) and ethyl methyl carbonate (EMC) were mixed in a volume ratio of 3:7 was used.

(Separator)

A microporous membrane made of polyethylene (H6022 produced by Asahi Kasei Corp.) having a thickness of 20 μm was used for a separator.

The prismatic lithium secondary battery (battery 1) assembled by the above procedure was subjected to the following tests.

(Measurement of Battery Thickness)

A central part of a longer side of the assembled prismatic lithium secondary battery was sandwiched between calipers in a direction perpendicular to the longer side (a horizontal direction from a short side) to measure a battery thickness. A measured value at this time was recorded as "a battery thickness (mm) before a test".

Further, the measurement of the battery thickness was performed again in the same manner as in the above after the following discharge capacity test. A measured value at this time was recorded as "a battery thickness (mm) after a test".

(Discharge Capacity Test)

First, an initial charge-discharge (first charge-discharge) of one cycle was performed at 25° C. Charge was constant current-constant voltage charge with a current of 0.1 CmA and a voltage of 4.6 V. Here, charge was carried out at a constant current-constant voltage charge with a current of 0.2 CmA and a voltage of 4.5 V for 8 hours, and discharge was carried out at constant current discharge under the conditions of a current of 0.2 CmA and a final voltage of 2.0 V. Subsequently, a discharge capacity test was performed. The conditions of the discharge capacity test were composed of charge-discharge of one cycle under the same conditions as in the above first charge-discharge except for changing the charge voltage to 4.2 V. A discharge electrical quantity at this time was recorded as "discharge capacity (mAh)".

(Gas Analysis)

A battery after discharge was disassembled in liquid paraffin, and all of gas released from the battery inside was collected in a manner of water substitution. Component analysis of the gas was carried out by using gas chromatography (HP5890 series II gas chromatograph manufactured by HEWLETT PACKARD CORPORATION) equipped with MolecularSieve13X and Porapak Q columns (both manufactured by SPELCO GbR).

(Battery 2)

A discharge capacity test and gas analysis were performed in the same manner as in the battery 1 except for setting the charge voltage at the first charge-discharge to 4.45 V using a lithium secondary battery (battery 2) assembled by the same procedure as in the battery 1.

(Battery 3)

A discharge capacity test and gas analysis were performed in the same manner as in the battery 1 except for setting the charge voltage at the first charge-discharge to 4.40 V using a lithium secondary battery (battery 3) assembled by the same procedure as in the battery 1.

(Battery 4)

A discharge capacity test was performed in the same manner as in the battery 1 except for setting the charge voltage at the first charge-discharge to 4.20 V using a lithium secondary battery (battery 4) assembled by the same procedure as in the battery 1.

The results of battery thickness measurement and the results of the discharge capacity tests of the batteries 1 to 4 are shown in Table 5.

TABLE 5

| Battery | Charge Voltage | | Battery Thickness (mm) | | Discharge Capacity (mAh) |
|---|---|---|---|---|---|
| | Battery Voltage (V) | Positive Electrode (V) | Before Test | After Test | |
| Battery 1 | 4.50 | 4.60 | 5.18 | 5.83 | 650 |
| Battery 2 | 4.45 | 4.55 | 5.18 | 5.18 | 657 |
| Battery 3 | 4.40 | 4.50 | 5.18 | 5.18 | 576 |
| Battery 4 | 4.20 | 4.30 | 8.18 | 5.18 | 247 |

The results of analysis of gas components in cells of the batteries 1, 2 and 3 are shown in Table 6.

TABLE 6

| | Collected Amount (ml) | $O_2/(N_2 + O_2)$ | CO/Collected Amount |
|---|---|---|---|
| Battery 1 | 0.81 | 0.22 | 0.21 |
| Battery 2 | 0.47 | 0.21 | 0.13 |
| Battery 3 | 0.30 | 0.22 | 0.07 |
| Atmosphere | | 0.21 | 0.00* |

*A volume ratio of CO in the atmosphere is $10^{-7}$.
Note)
±5% is assumed to be within the range of measurement error.

The following is apparent from Table 5 and Table 6.

Although the battery 1 swelled after the discharge capacity test and the collected amount of gas (corresponding to an amount of gas in a cell) was large compared with the battery 2 and the battery 3, the battery 1 was not thought to generate oxygen since a volume ratio between oxygen and nitrogen $(O_2/(N_2+O_2))$ did not differ from ordinary atmospheric components. Since in the battery 1, the volume ratio of CO gas (CO/Collected Amount) was increased, swelling of the battery 1 was thought to result from the oxidation decomposition of the electrolyte solution at the positive electrode plate.

That is, even when the charge in the initial charge-discharge (first charge-discharge) was carried out up to 4.50 V as a battery voltage [4.60 V (vs. Li/Li$^+$) as a positive electrode potential], the volume ratio of oxygen was not changed from that before the test, and oxygen was not generated.

In the battery 2, the battery 3 in which the charge voltage in the first charge-discharge of the battery was set to 4.45 V, 4.40 V [4.55 V (vs. Li/Li$^+$), 4.50 V (vs. Li/Li$^+$) as a positive electrode potential] and the test was performed, swelling of the battery was less than the battery 1 charged at 4.50 V, and the collected amount of gas (corresponding to an amount of gas in a cell) was reduced. Further, the ratio between oxygen and nitrogen $(O_2/(N_2+O_2))$ was not changed, and the ratio of CO gas in the collected gas (CO/Collected Amount) was reduced in conjunction with the reduction of the positive electrode potential.

With respect to the discharge capacity at the time of charging at a battery voltage of 4.2 V [4.3 V (vs. Li/Li$^+$) as a positive electrode potential], in the battery 1, the battery 2 in which the charge in the first charge-discharge was carried out at 4.60 V (vs. Li/Li$^+$), 4.55 V (vs. Li/Li$^+$) as a maximum achieved potential of the positive electrode, both of the discharge capacities were large to the same extent, but in the battery 3 in which the charge in the first charge-discharge was carried out at 4.50 V (vs. Li/Li$^+$), the discharge capacity is decreased a little, and further when the charge in the first charge-discharge was carried out at 4.30 V (vs. Li/Li$^+$), the discharge capacity was extremely decreased. Accordingly, when the positive active material of the present invention is used and the step including the initial charge-discharge (initial formation) is performed to manufacture a lithium secondary battery, the maximum achieved potential of the positive electrode of the charge in the initial charge-discharge is preferably set to 4.5 V or more.

Figure 8:
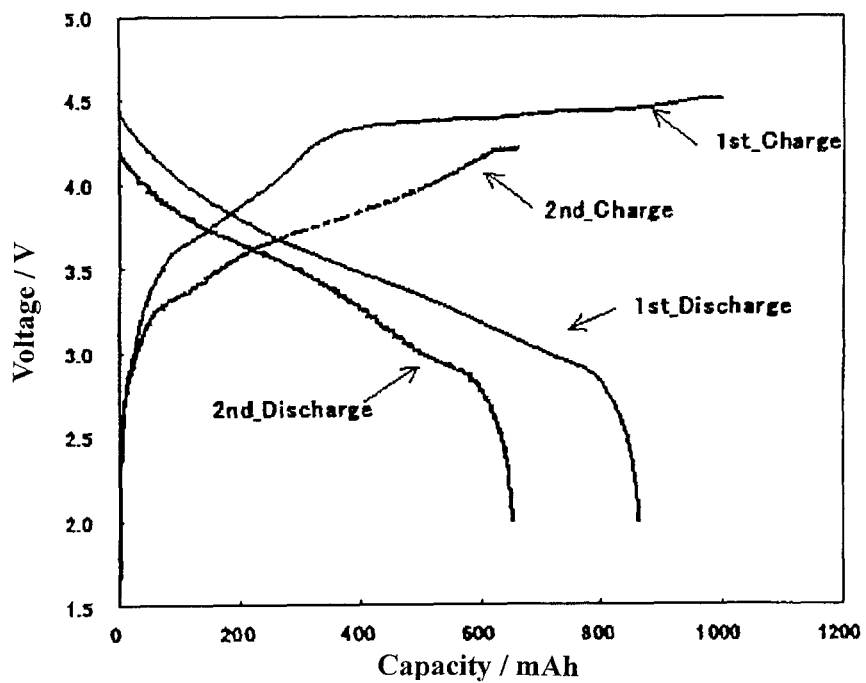
FIG. 8 is a view showing potential behavior during an initial charge-discharge step of a battery 1 in Example 3.
Figure 10:
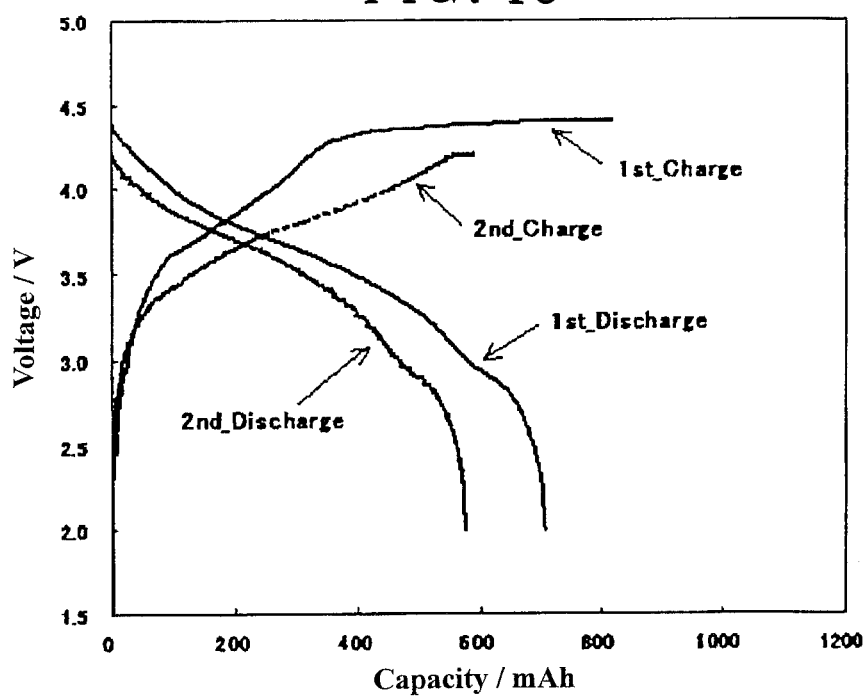
FIG. 10 is a view showing potential behavior during an initial charge-discharge step of a battery 3 in Example 3.

In view of FIG. 8 to FIG. 10 showing potential behavior at the initial charge-discharge step of the batteries 1, 2 and 3, it has been found that a plateau potential of the positive active material of the present invention is around 4.5 V, and it has been confirmed that the active material of the present invention has the plateau potential in the charge range and does not generate oxygen gas at the plateau potential or more.

However, even when an active material not generating oxygen gas during charge is used, if the initial charge is performed to 4.6 V (vs. Li/Li$^+$) or more as a maximum achieved potential of the positive electrode, gas is generated due to decomposition of an electrolyte solution.

Figure 11:
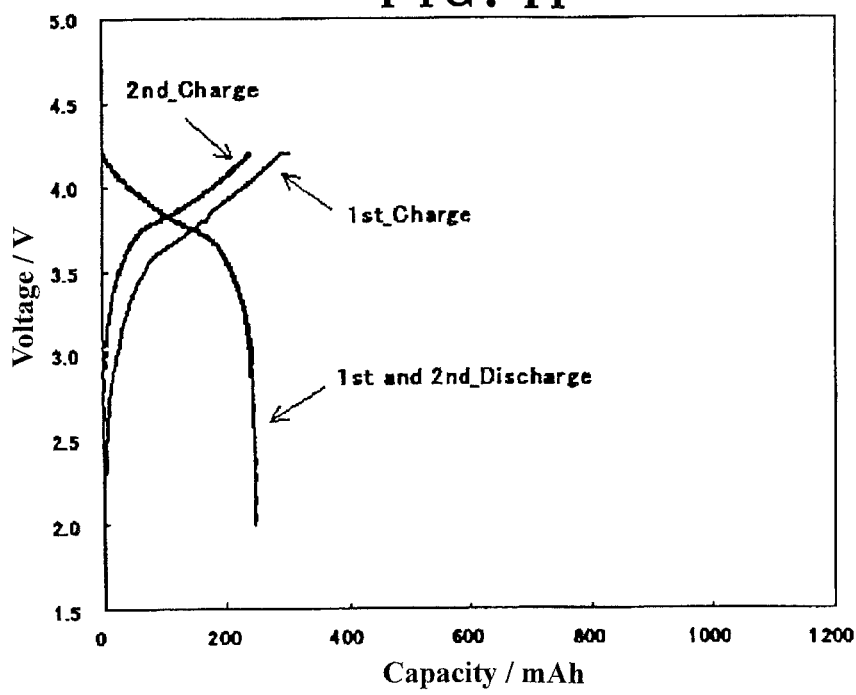
FIG. 11 is a view showing potential behavior during an initial charge-discharge step of a battery 4 in Example 3.

Further, when the initial charge is performed at a potential less than 4.5 V (vs. Li/Li$^+$) as a maximum achieved potential of the positive electrode not undergoing a plateau potential as in the battery 4, there is a problem that a discharge capacity at the time of charging to 4.2 V as a battery voltage [4.3 V (vs. Li/Li$^+$) as a positive electrode potential] is small (refer to FIG. 11).

Therefore, the maximum achieved potential of the positive electrode is preferably 4.5 V (vs. Li/Li$^+$) or more and less than 4.6 V (vs. Li/Li$^+$) even when the positive active material not generating oxygen gas during charge is used, and particularly, the maximum achieved potential of about 4.55 V (vs. Li/Li$^+$) is thought to be an optimum initial formation (initial charge-discharge) condition.

DESCRIPTION OF REFERENCE SIGNS 1 lithium secondary battery
2 electrode group
3 positive electrode
4 negative electrode
5 separator
6 battery case
7 lid
8 safety valve
9 negative electrode terminal
10 positive electrode lead
11 negative electrode lead

INDUSTRIAL APPLICABILITY

The active material for a nonaqueous electrolyte secondary battery of the present invention can be effectively used for nonaqueous electrolyte secondary batteries of a power supply for electric vehicles, a power supply for electronic equipment, and a power supply for electric power storage since the active material for a nonaqueous electrolyte secondary battery has a large discharge capacity, and is superior in charge-discharge cycle performance, initial efficiency and high rate discharge performance.

The invention claimed is:

1. A positive active material for a nonaqueous electrolyte secondary battery containing a lithium transition metal composite oxide which has a crystal structure of an α-NaFeO$_2$ type, is represented by a compositional formula Li$_{1+\alpha}$Me$_{1-\alpha}$O$_2$ wherein Me is a transition metal element including Co, Ni and Mn, α>0, and has a molar ratio Li/Me of Li to the transition metal element Me of 1.250 to 1.350, wherein a molar ratio Co/Me of Co in the transition metal element Me is 0.040 to 0.195,
a molar ratio Mn/Me of Mn in the transition metal element Me is 0.625 to 0.707,
the lithium transition metal composite oxide is observed as a single phase attributed to a space group R3-m on an X-ray diffraction chart when it is electrochemically oxidized up to a potential of 5.0 V (vs. Li/Li$^+$),
in the lithium transition metal composite oxide, an oxygen position parameter, determined by crystal structure analysis by a Rietveld method at the time of using a space group R3-m as a crystal structure model based on an X-ray diffraction pattern in a state of a discharge end, is 0.260 or less, and
a tapped density of the positive active material is 0.52 to 1.98 g/cm$^3$.

2. The positive active material for a nonaqueous electrolyte secondary battery according to claim 1, wherein a BET specific surface area is 0.88 m$^2$/g or more.

3. The positive active material for a nonaqueous electrolyte secondary battery according to claim 2, wherein the tapped density is 1.25 to 1.98 g/cm$^3$.

4. The positive active material for a nonaqueous electrolyte secondary battery according to claim 1, wherein a ratio between the diffraction peak intensity I$_{(003)}$ of (003) line and the diffraction peak intensity I$_{(114)}$ of (114) line based on X-ray diffraction measurement before charge-discharge satisfies I$_{(003)}$/I$_{(114)}$≥1.20.

5. The positive active material for a nonaqueous electrolyte secondary battery according to claim 1, wherein oxygen gas is not generated from the lithium transition metal composite oxide when potential is within the range of 4.5 to 4.6 V (vs. Li/Li$^+$) as a potential of a positive electrode.

6. The positive active material for a nonaqueous electrolyte secondary battery according to claim 1, wherein when the positive active material is used in a battery as a material of a positive electrode and the battery is charged so that a potential of the positive electrode is within the range of 4.5 to 4.6 V (vs. Li/Li$^+$), a volume ratio of oxygen gas generated from the lithium transition metal composite oxide to the total amount of nitrogen gas and the oxygen gas contained in the battery is 0.20 to 0.25.

7. The positive active material for a nonaqueous electrolyte secondary battery according to claim 5, wherein oxygen gas is not generated from the lithium transition metal composite oxide when potential is within the range of 4.55 to 4.6 V (vs. Li/Li$^+$) as a potential of a positive electrode.

8. The positive active material for a nonaqueous electrolyte secondary battery according to claim 5, wherein the charge is a charge in the initial charge-discharge.

9. The positive active material for a nonaqueous electrolyte secondary battery according to claim 5, wherein the positive active material has a plateau potential in a charge range, and any potential within the range of 4.5 to 4.6 V (vs. Li/Li$^+$) is the plateau potential or more.

10. The positive active material for a nonaqueous electrolyte secondary battery according to claim 1, wherein the lithium transition metal composite oxide is obtained by mixing/sintering a coprecipitated precursor of compounds of the transition metal elements including Co, Ni and Mn, and a lithium compound.

11. A method of manufacturing the positive active material for a nonaqueous electrolyte secondary battery according to claim 1, comprising the steps of coprecipitating compounds of transition metal elements including Co, Ni and Mn in a solution to produce a coprecipitated precursor; and mixing/sintering the coprecipitated precursor and a lithium compound.

12. The method of manufacturing a positive active material for a nonaqueous electrolyte secondary battery according to claim 11, wherein a pH in the step of coprecipitating compounds of transition metal elements including Co, Ni and Mn in a solution to produce a coprecipitated precursor is 8.5 to 11.0.

13. The method of manufacturing a positive active material for a nonaqueous electrolyte secondary battery according to claim 11, wherein a sintering temperature in the step of mixing/sintering the coprecipitated precursor and a lithium compound is 800 to 940° C.

14. An electrode for a nonaqueous electrolyte secondary battery containing the positive active material for a nonaqueous electrolyte secondary battery according to claim 1.

15. A nonaqueous electrolyte secondary battery including the electrode for a nonaqueous electrolyte secondary battery according to claim 14.

16. The nonaqueous electrolyte secondary battery according to claim 15, wherein a charge method, in which a maximum achieved potential of a positive electrode at the time of charge is lower than 4.4 V (vs. Li/Li$^+$), is employed at the time of use.

* * * * *